United States Patent
Kajiwara et al.

(10) Patent No.: US 9,785,520 B2
(45) Date of Patent: Oct. 10, 2017

(54) COMPUTER SYSTEM, STORAGE APPARATUS AND CONTROL METHOD

(71) Applicant: Hitachi, Ltd., Tokyo (JP)

(72) Inventors: Yuta Kajiwara, Tokyo (JP); Tomoyuki Kato, Tokyo (JP); Ken Tokoro, Tokyo (JP)

(73) Assignee: HITACHI, LTD., Tokyo (JP)

( * ) Notice: Subject to any disclaimer, the term of this patent is extended or adjusted under 35 U.S.C. 154(b) by 317 days.

(21) Appl. No.: 14/424,176

(22) PCT Filed: Apr. 4, 2014

(86) PCT No.: PCT/JP2014/059934
§ 371 (c)(1),
(2) Date: Feb. 26, 2015

(87) PCT Pub. No.: WO2015/151270
PCT Pub. Date: Oct. 8, 2015

(65) Prior Publication Data
US 2016/0259696 A1    Sep. 8, 2016

(51) Int. Cl.
*G06F 11/00* (2006.01)
*G06F 11/20* (2006.01)

(52) U.S. Cl.
CPC ........ *G06F 11/201* (2013.01); *G06F 11/2005* (2013.01); *G06F 2201/805* (2013.01); *G06F 2201/815* (2013.01); *G06F 2201/85* (2013.01)

(58) Field of Classification Search
USPC ...................................................... 714/47.3
See application file for complete search history.

(56) References Cited

U.S. PATENT DOCUMENTS 6,571,358 B1 * 5/2003 Culotta .............. H04Q 3/54591
                                                                370/242
7,861,002 B2 * 12/2010 Puon ....................... H04L 45/00
                                                                370/225

(Continued)

FOREIGN PATENT DOCUMENTS

JP    2004-005370 A    1/2004
JP    2007-304896 A    11/2007

(Continued)

*Primary Examiner* — Sarai Butler
(74) *Attorney, Agent, or Firm* — Volpe and Koenig, P.C.

(57) ABSTRACT

A computer system has a storage system including a first port and a second port, and a relay apparatus which couples the first port to an initiator apparatus. The storage apparatus stores relay apparatus information indicating a relay apparatus, and initiator information indicating an initiator apparatus. The storage apparatus establishes communications between the first port and a first relay apparatus, and based on communications with the relay apparatus recognizes the initiator apparatus with which the first relay apparatus has established communications. The storage apparatus also stores, in pathway information, a first pathway containing the first port, the first relay apparatus and the initiator apparatus. The storage apparatus creates a virtual port, which is a virtual port to which the first port is allocated, and when an initiator apparatus establishes communications with the virtual port, this apparatus adds a first virtual port associated pathway, in which the virtual port is associated with the first pathway, to the pathway information.

11 Claims, 22 Drawing Sheets

(56) References Cited

U.S. PATENT DOCUMENTS

| | | | |
|---|---|---|---|
| 8,233,383 B2 * | 7/2012 | Kitani | ................ H04L 49/1523 370/220 |
| 8,429,446 B2 | 4/2013 | Hara et al. | |
| 2003/0221077 A1 | 11/2003 | Ohno et al. | |
| 2012/0290750 A1 | 11/2012 | Kawaguchi | |

FOREIGN PATENT DOCUMENTS

| | | |
|---|---|---|
| JP | 2012-238299 A | 12/2012 |
| JP | 5255858 B2 | 8/2013 |
| WO | 2012/157038 A1 | 11/2012 |

* cited by examiner

Initiator Path Lookup List

Fig. 7

| # | Process | Summary | Operating entity | | | |
|---|---|---|---|---|---|---|
| 1 | Port Configuration Definition | Port Configuration (Priority Port/FC Dev) | SRV | CPU | -- | -- |
| 2 | Port H/W Initialization | P1 Initialization, Activation | -- | CPU | P1 | -- |
| 3 | Port Link Establishment | P1 Logs Into F1 (F_Port_CTL / NS) | -- | CPU | P1 | -- |
| 4 | Pathway Information Gathering (F1 Coupling Trigger) | Acquire Initiator Information | -- | CPU | -- | -- |
| 5 | | Register P1 | -- | CPU | P1 | |
| 6 | Create FC Device | Initialize V1 | -- | CPU | -- | -- |
| 7 | FC Device Establish Link | V1 Logs Into F1 (F_Port_CTL / NS) | -- | CPU | P1 | V1 |
| 8 | | V1 Registers FC Device In F1 | -- | CPU | P1 | V1 |
| 9 | Establish Initiator Pathway | IIn1 Logs Into V1 | -- | CPU | P1 | V1 |
| 10 | Pathway Information Gathering (Initiator Login Trigger) | CPU Propagates Information Relating To New 'In1' Login To FC Device | -- | CPU | -- | -- |
| 11 | | Acquire 'In1' Registration Information For Switches Coupled To Po | -- | CPU | Po | -- |
| 12 | | Prepare Pathway Information For Ports In Po Having a Pathway With 'In1' | -- | CPU | -- | -- |
| 13 | Switch (Backup) Port | Detect Pathway Failure Of FC Device | -- | CPU | P1 | -- |
| 14 | | Set Backup Destination IF Port (Pt1) For FC Device | -- | CPU | -- | -- |
| 15 | FC Device Establish Link | V1 Based On Pt1 Logs Into F1 (F_Port_CTL/NS) | -- | CPU | Pt1 | V1 |
| 16 | | V1 Based On Pt1 Re-registered As FC Device In F1 | -- | CPU | Pt1 | V1 |
| 17 | Establish Initiator Pathway | In1 Logs Into V1 | -- | CPU | Pt1 | V1 |
| 18 | Switch (Migrate) Port | Detect Pathway Failure Of FC Device | -- | CPU | Pt1 | -- |
| 19 | | Set Migration Destination IF Port (Pt2) For FC Device | -- | CPU | -- | -- |
| 20 | FC Device Establish Link | Migrated V1 Logs Into F1 (F_Port_CTL/NS) | -- | CPU | Pt2 | V1 |
| 21 | | Migrated V1 Re-registered As FC Device In F1 | -- | CPU | Pt2 | V1 |
| 22 | Establish Initiator Pathway | In1 Logs Into V1 | -- | CPU | Pt2 | V1 |
| 23 | IF Port Recovery | P1 Logs Into F1 (F_Port_CTL/NS) | -- | CPU | P1 | -- |
| 24 | | Acquire Coupled Initiator | -- | CPU | -- | -- |
| 25 | | Acquire Registration In Coupling Destination Fabric | -- | CPU | P1 | -- |
| 26 | Switch (Recover) Port | Detect State Of Recovered P1 | -- | CPU | -- | -- |
| 27 | | Restore V1 Onto Recovered P1 | -- | CPU | -- | -- |
| 28 | FC Device Establish Link | V1 Logs Into F1 (F_Port_CTL/NS) | -- | CPU | Pt1 | V1 |
| 29 | | Recovered V1 Re-registered As FC Device In F1 | -- | CPU | Pt1 | V1 |

Fig. 16

1601 — Initiator List Data

| Initiator List Index | Initiator List Data |
|---|---|
| — | First List Pointer = [->0](First Index) |
| 0 | Initiator ID = Wa<br>Initiator Port-ID = Pa<br>Pathway Port List Pointer<br>Initiator List Pointer = [->1](Next Index) |
| 1 | Initiator ID = Wb<br>Initiator Port-ID = Pb<br>Pathway Port List Pointer<br>Initiator List Pointer = [->N](Next Index) |
| .. | .. |
| N | Initiator ID = Wc<br>Initiator Port-ID = Pc<br>Pathway Port List Pointer<br>Initiator List Pointer = Null (Endpoint Indicator) |
| .. | .. |
| Virtual Storage Coupled Device Maximum Value | Initiator ID = Null<br>Initiator Port-ID = Null<br>Pathway Port List Pointer<br>Initiator List Pointer Null |

1600 / 1602 — Pathway Port List Information

| Coupled Port List Index | Pathway Port List Information |
|---|---|
| 0 | Physical Storage#0<br>IF Port # 0<br>Coupled Fabric Identifier<br>Port List Pointer = [->N] (Next Index) |
| 1 | Physical Storage#0<br>IF Port # 1<br>Coupled Fabric Identifier= Null<br>Port List Pointer = Null |
| .. | .. |
| N | Physical Storage# X<br>IF Port # Y<br>Coupled Fabric Identifier<br>Port List Pointer = Null (Endpoint Indicator) |
| .. | .. |
| Configured Port * Configured Physical Storage Number Maximum Value | Physical Storage# Max<br>IF Port # Max<br>Coupled Fabric Identifier = Null<br>Port List Pointer = Null |

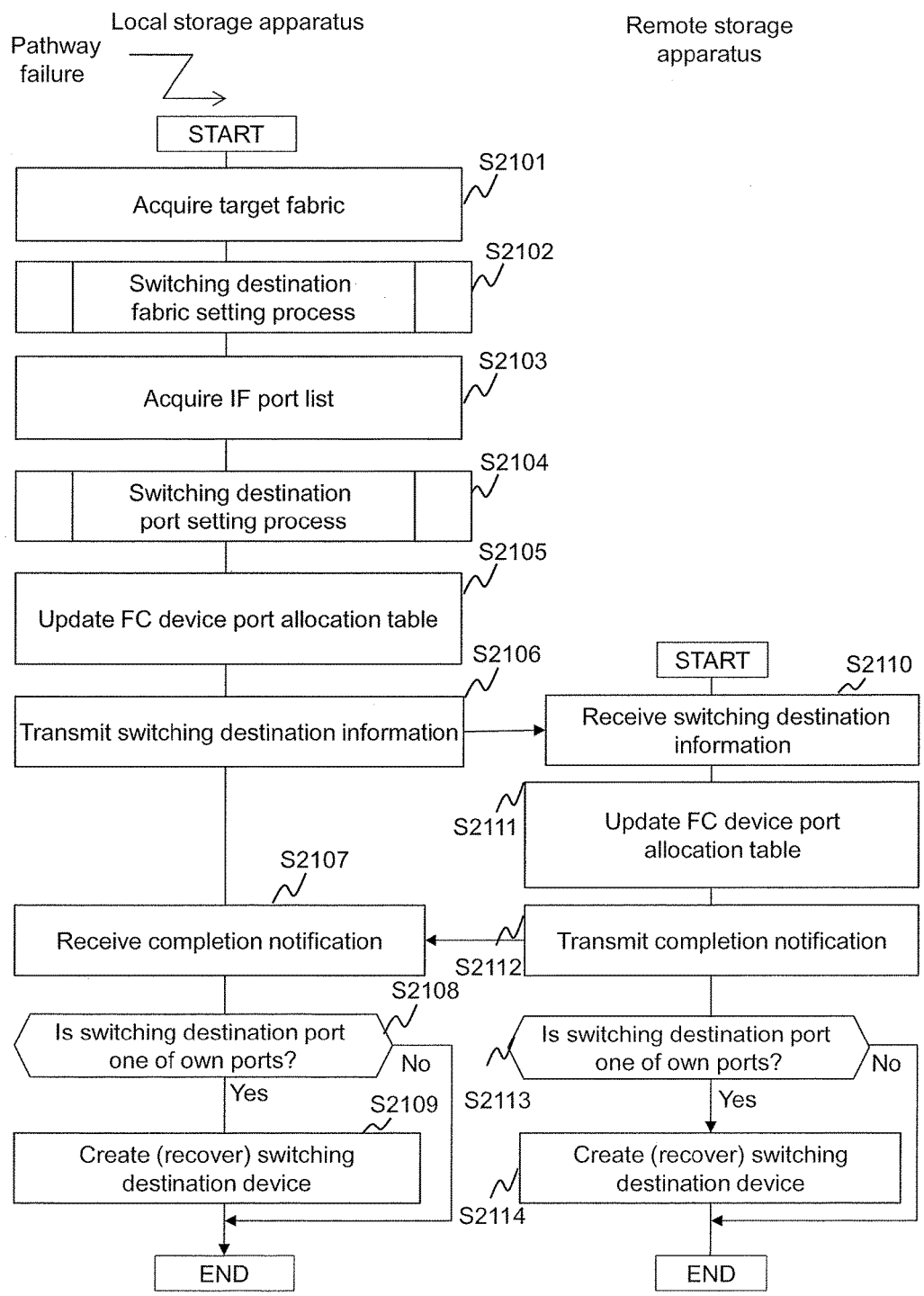

COMPUTER SYSTEM, STORAGE APPARATUS AND CONTROL METHOD

TECHNICAL FIELD

The present invention relates to a computer system, and generally refers to path redundancy.

BACKGROUND ART

There are known techniques relating to storage systems whereby redundancy is provided to a path between an initiator and a target device of a storage apparatus in order to ensure continuation of access in the event of failure.

For example, in PTL 1 a technique is disclosed in which a pathway in which a failure has occurred is switched using a virtualized port ID employing NPIV (N_Port ID Virtualization).

CITATION LIST

Patent Literature

[PTL 1]
Japanese Patent No. 5255858

SUMMARY OF INVENTION

Technical Problem

In the abovementioned PTL 1, in order to switch a pathway if a failure has occurred in a physical port contained in a pathway between an initiator and a target device of a storage apparatus, a set of physical ports, which are the objects to be switched, is grouped in advance. Providing pathway redundancy in this way in order to ensure continued access results in a complex operation for the user, as it is necessary to define in advance the information relating to pathways which physically connect a plurality of physical devices.

Solution to Problem

In order to resolve the abovementioned problem, the computer system according to the present invention has a storage system including a first port and a second port, and a relay apparatus which couples the first port to an initiator apparatus. The storage apparatus stores relay apparatus information indicating a relay apparatus, and initiator information indicating an initiator apparatus. The storage apparatus establishes communications between the first port and a first relay apparatus, and based on communications with the relay apparatus recognizes the initiator apparatus with which the first relay apparatus has established communications. The storage apparatus also stores, in pathway information, a first pathway containing the first port, the first relay apparatus and the initiator apparatus. The storage apparatus creates a virtual port, which is a virtual port to which the first port is allocated, and when an initiator apparatus establishes communications with the virtual port, this apparatus adds a first virtual port associated pathway, in which the virtual port is associated with the first pathway, to the pathway information.

In the present invention, the storage apparatus gathers information such as the relay apparatus port ID and performs path switching based on this information, thereby making it possible to preferentially select (automatically) a normal path, which it is expected would have been used as the optimal pathway, and an alternative path on the same pathway.

Advantageous Effects of Invention

The pre-defined configuration definitions for providing pathway redundancy between the initiator and the target device can be eliminated.

BRIEF DESCRIPTION OF DRAWINGS

FIG. 7 is a chart used to explain each process in the sequence in FIG. 6.

FIG. 16 is an initiator path lookup list 1600 of example 2.

FIG. 22 is a flowchart of a port switching process according to example 2.

DESCRIPTION OF EMBODIMENTS

Figure 1:
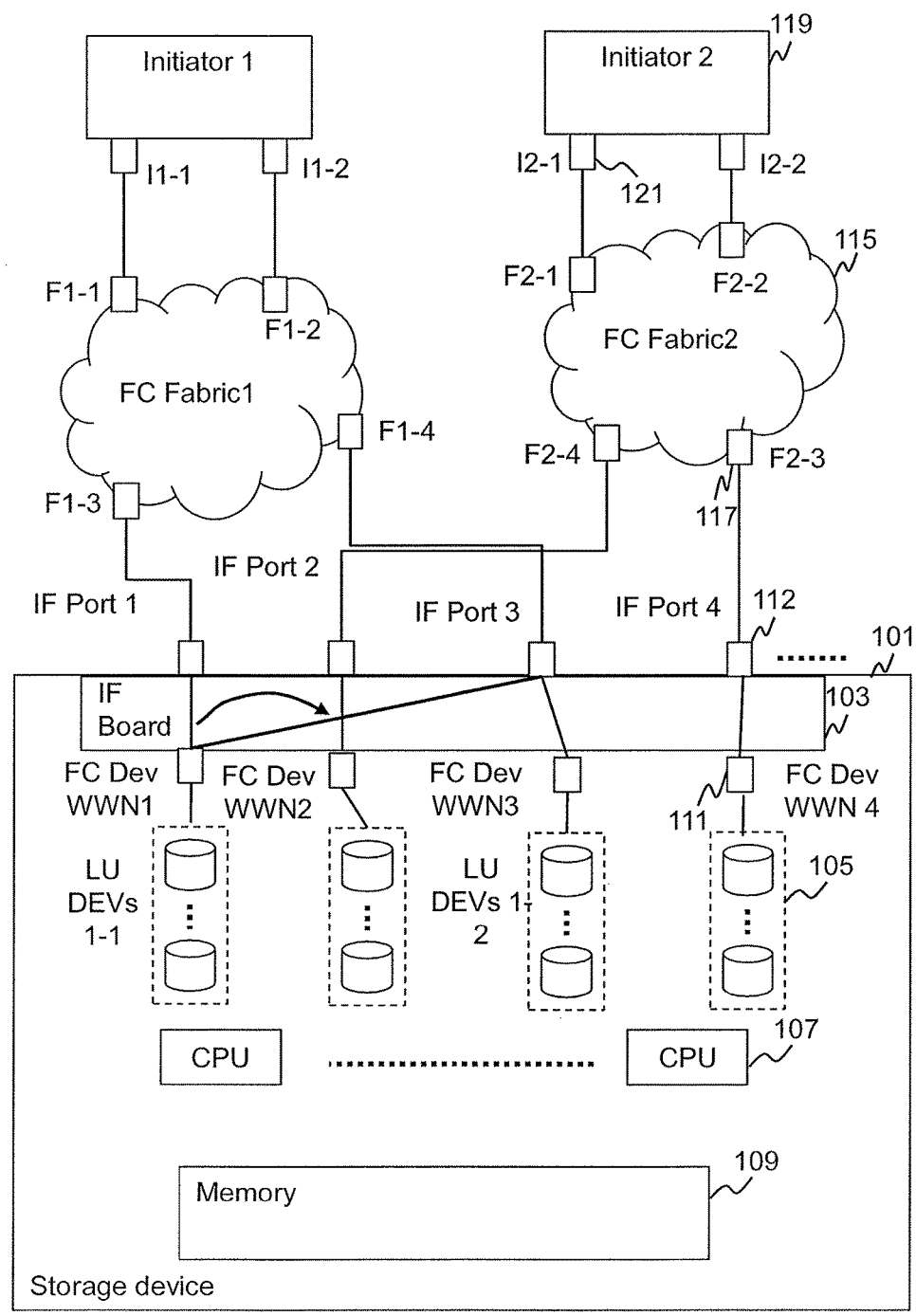
FIG. 1 is a summary of a computer system according to example 1.

In the following explanation, information is in some cases described using expressions 'kkk list', 'kkk table', 'kkk pointer', but information may also be expressed using data structures other than tables. To indicate that there is no dependence on the data structure, 'kkk table' can be referred to as 'kkk information'.

Also, in the following explanation, processes are in some cases described with 'program' as the subject, but a program performs defined processes while making appropriate use of storage resources (for example memory) and/or communications interface devices (for example communication ports), by being executed by a processor, and therefore the subject of the process may also be deemed to be the processor. Conversely, processes which take the processor as the subject may be interpreted as being performed by the execution of one or more programs. A processor is typically a microprocessor such as a CPU (Central Processing Unit), but it may contain a hardware circuit which executes some of the processing (for example encoding/decoding, compression/decompression).

Further, in the following explanation, 'LU' is an abbreviation for logical unit, which is a logical storage device. LU may also be referred to as logical volume. An LU may have an online LU which is offered to an external apparatus (such as a host computer) coupled to a storage system which offers the LU, and an offline LU which is not offered to the external apparatus (is not recognized by the external apparatus). Further, an LU may be an actual LU or a virtual LU. An actual LU is an LU based on one or more PDEVs. 'PDEV' is an abbreviation for a non-volatile physical storage device, for example an HDD (Hard Disk Drive) or an SSD (Solid State Drive). One or more RAID groups (Redundant Array of Independent (or Inexpensive) Disks) may be configured from a plurality of PDEVs (RAID group may also be referred to as parity group). A virtual LU may for example be an externally-coupled LU, a TP-LU or a snapshot LU. An externally-coupled LU is an LU complying with storage virtualization technology, based on a storage resource (for example an LU) of an external storage system coupled to a storage system. A TP-LU is an LU complying with capacity virtualization technology (typically Thin Provisioning). A snapshot LU is an LU offered as a snapshot of an original LU. A storage system may consist of one or more storage apparatuses.

Further, in the following explanation, in situations in which the same types of element are described without being distinguished from each other, a reference code such as 'initiator apparatus 119' is used, but in situations in which the same types of element are distinguished from each other in the description, an identifier (for example a number and/or a code) allocated to the element is in some cases used instead of the reference code for the element, as in initiator apparatuses :1 and :2.

Several examples will now be described in which an FC network such as an SAN (Storage Area Network) is taken as an example of a communications network through which a path being switched passes. It should be noted that the present invention may also be applied to the switching of paths which pass through communications networks other than FC networks.

EXAMPLE 1

FIG. 1 is a summary of a computer system according to example 1.

The computer system has a storage apparatus 101 and an initiator apparatus 119. One or more initiator apparatuses 119 are coupled to the storage apparatus 101 via one or more FC (Fiber Channel) fabrics 115.

An FC fabric 115 is a network which couples an initiator apparatus 119 to the storage apparatus 101. More specifically, the FC fabric 115 for example contains one or more FC switches and couples the initiator apparatus 119 to the storage apparatus 101 via an FC switch. The FC fabric 115 is configured by coupling a plurality of ports 115 of the FC switches to ports 121 possessed by the initiator apparatus 119 and to IF ports 112 possessed by the storage apparatus 101. The FC switches within the FC fabric 115 also manage device information, which is information relating to coupled devices.

The storage apparatus 101 has CPUs 107, a memory 109 and IF (Interface) ports 112.

The memory 109 stores programs and various types of information within the computer system. A fabric registration device list 500, an initiator path lookup list 600, an FC device port allocation table 700, a pathway information gathering program, a port switching control program and the like are stored in the memory 109, for example. An initiator configuration list is also for example stored in the memory 109. The initiator configuration list comprises information relating to the initiator apparatuses 119 that are coupled to each IF port 112 possessed by the storage apparatus 101.

The CPUs 107 control each device in the computer system by executing various programs stored in the memory 109.

The IF ports 112 are ports for coupling to the FC fabric 115.

The storage apparatus 101 creates LU devices (DEVx) 105, FC devices (DEVs) 111 and an IF board (Board) 103.

An FC device 111 is a virtual device which is created corresponding to an arbitrary IF port 112 and which is offered to an initiator apparatus 119. An LU device 105 is a logical device created based on one or more physical storage devices. The initiator apparatus 119 transmits an I/O (Input or Output) request to the storage apparatus 101, specifying an identifier of an LU device 105 and a WWN (worldwide name) of an FC device 111.

The IF board 103 is a virtual switch which switches pathways between IF ports 112 and FC devices 111. In the present example the IF ports 112 are allocated to the FC devices 111 by means of an FC device port allocation table 700.

By means of the abovementioned configuration, pathways which effect communications between the initiator apparatuses 119 and the storage apparatus contain an FC fabric 115, an IF port 112 possessed by the storage apparatus 101, and an FC device 111 allocated to the IF port 112. The storage apparatus 101 acquires and maps information relating to the devices contained in each pathway, and stores this information in the memory 107 as pathway information. Also, if a pathway is cut off due to a malfunction of a physical device (for example an IF port 112), the storage apparatus 101 detects the malfunctioning physical device and switches it over to another physical device contained in another pathway that communicates with the initiator apparatus 119.

Figure 2:
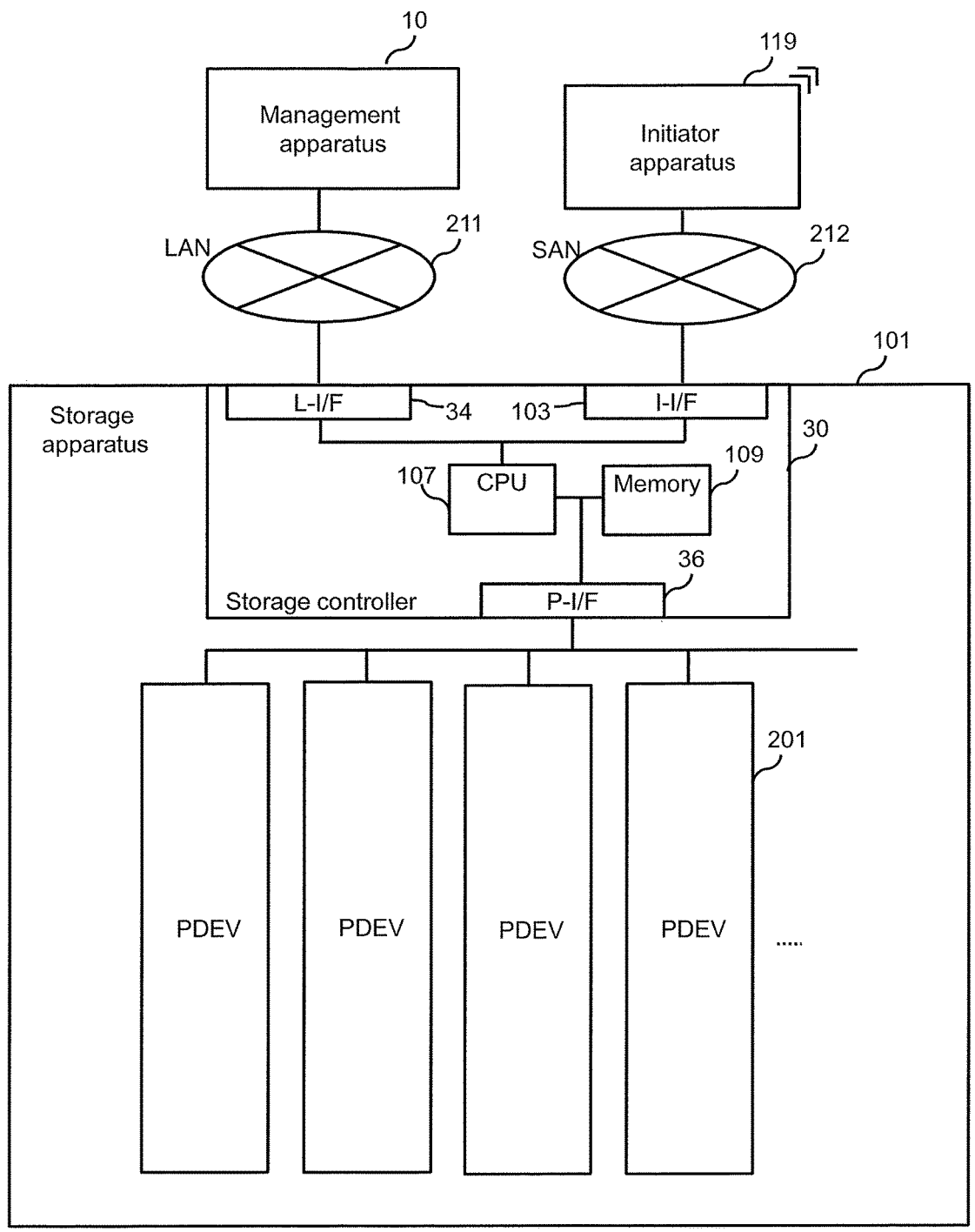
FIG. 2 illustrates the configuration of a storage apparatus 101.

FIG. 2 illustrates the configuration of the storage apparatus 101.

The storage apparatus 101 has a plurality of PDEVs 201 and a storage controller 30 which is coupled to the plurality of PDEVs 201. A management apparatus 10 and an initiator apparatus 119 are coupled to the storage controller 30. The management apparatus 10 and the storage controller 30 are coupled via an LAN (Local Area Network) 211 such that they can communicate. Also, the initiator apparatus 119 and the storage controller 30 are coupled via an SAN 212 such that they can communicate. The SAN 212 contains the FC fabric 115 discussed hereinabove. The PDEV 201 is a storage medium such as a flash memory or an HDD (Hard Disk Drive).

The storage controller 30 has an L-I/F 34, an I-I/F 35, a P-I/F 36, a memory 109 and a CPU 31 which is coupled to these.

The L-I/F 34 is one or more LAN I/Fs (for example one or more LAN controllers). The storage controller 30 can communicate with the management apparatus 10 via the L-I/F 34.

The I-I/F 103 is one or more initiator I/Fs. The storage controller 30 can communicate with the initiator apparatus 119 via the I-I/F 103. As discussed hereinabove, the I-I/F 103 has a plurality of IF ports 112 (which are not shown in FIG. 2).

The P-I/F 36 is one or more PDEV I/Fs. The storage controller 30 can communicate with each PDEV 201 via the P-I/F 36.

The memory 109 is one or more memories. The memory 109 stores one or more computer programs executed by the CPU 107, and information used by the CPU 107. The memory 109 may contain a cache memory area which temporarily stores data input into or output from a PDEV 201.

The CPU 107 is one or more CPUs. The CPU 107 executes computer programs stored in the memory 109. The CPU 107 controls the operation of the storage controller 30.

The management apparatus 10 is an apparatus which manages the storage apparatus 101, and may consist of one or more computers. The management apparatus 10 can input information into the storage apparatus 101 and can output (display) information from the storage apparatus 101.

As discussed hereinabove, the initiator apparatus 119 is an apparatus which transmits I/O requests to the storage apparatus 101, and it may for example be one or more host computers.

Figure 3:
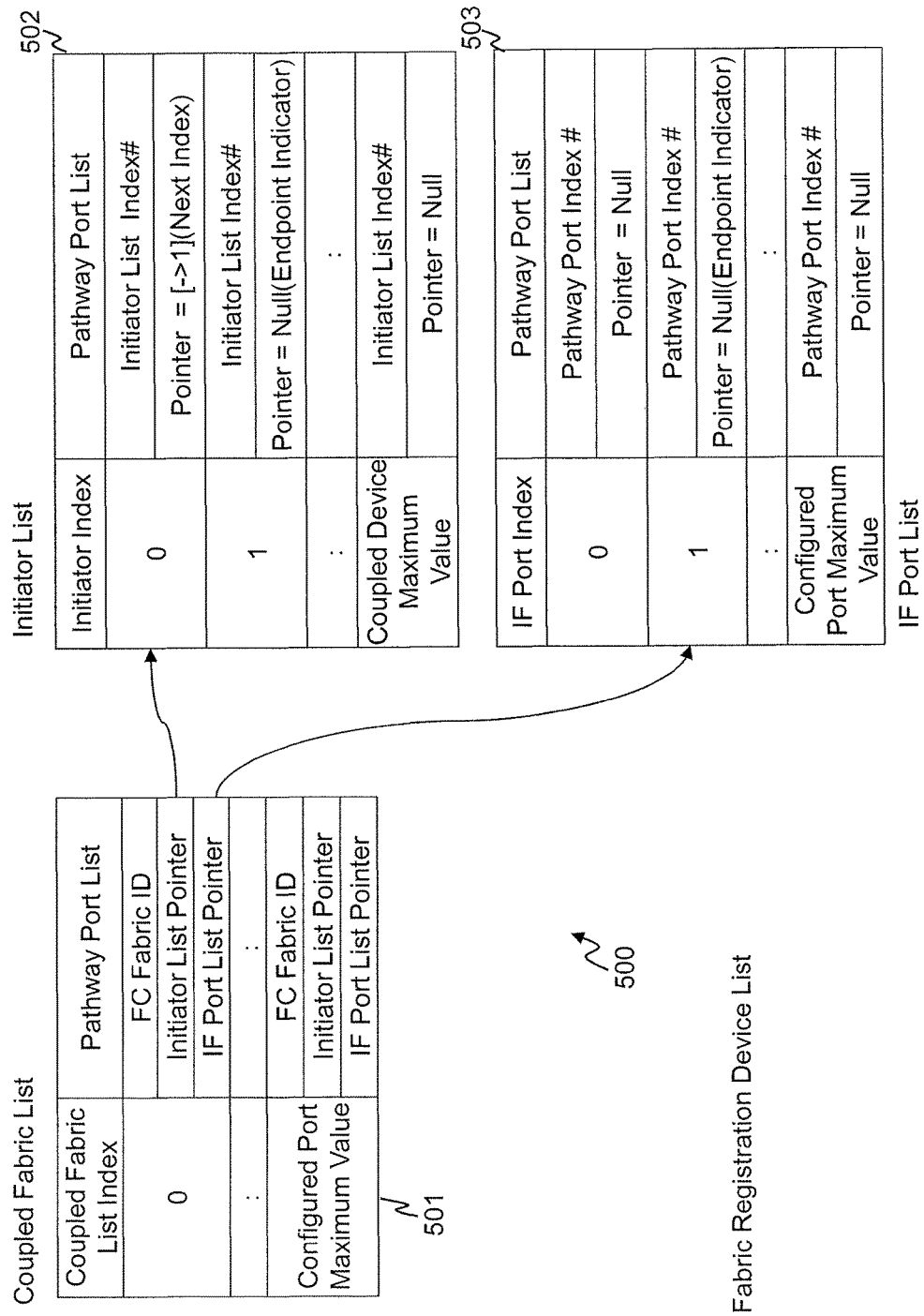
FIG. 3 is a fabric registration device list 500.

FIG. 3 is a fabric registration device list 500.

The fabric registration device list 500 is a list for looking up the initiator apparatuses 119 and the IF ports 112 coupled to each FC fabric 115, for all FC fabrics 115 coupled to the storage apparatus 101. The fabric registration device list 500 comprises information relating to the pathways between the FC fabrics 115, the initiators 119 and the IF ports 112. The fabric registration device list 500 includes a coupled fabric list 501, an initiator list 502 and an IF port list 503.

The coupled fabric list 501 is a list for managing the FC fabrics 115 coupled to the storage apparatus 101. The list 501 for example provides a coupled fabric index for each FC fabric 115 coupled to the storage apparatus 101, and maps to each coupled fabric index an FC fabric ID, a pointer indicating the start address of an initiator list 502, and a pointer indicating the start address of an IF port list 503.

The initiator list 502 is a list for managing the initiator apparatuses 119 coupled to each FC fabric 115. The list 502 for example provides an initiator index for each initiator apparatus 119 coupled to each FC fabric 115, and maps to each initiator index an initiator list index number (#) of a coupled initiator list 601, and a pointer indicating the start address of the next initiator index in this list 502.

The IF port list 503 is a list for managing the IF ports 112 coupled to each FC fabric 115. The list 503 for example provides an IF port index for each IF port 112 coupled to each FC fabric 115, and maps to each IF port index an IF port index number (#) of a coupled port list 602, and a pointer indicating the start address of the next IF port index in this list 503.

Figure 4:
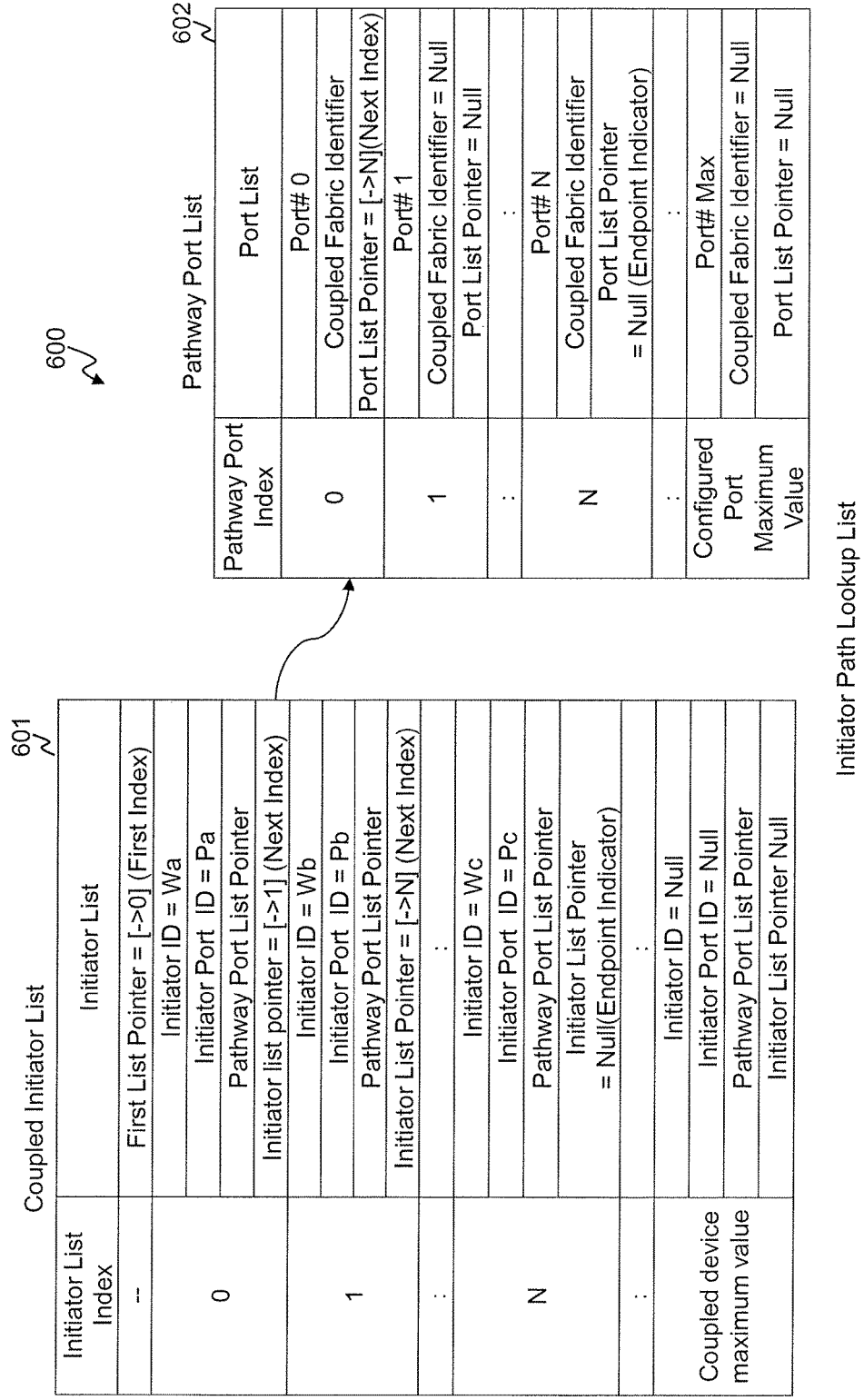
FIG. 4 is an initiator path lookup list 600.

FIG. 4 is an initiator path lookup list 600.

The initiator path lookup list 600 is a list for looking up, from each initiator apparatus 119, the IF ports 112 and the FC fabrics 115 coupled to the IF ports 112, for all initiator apparatuses 119 coupled to the storage apparatus 101. The initiator path lookup list 600 comprises information relating to the pathways between the initiators 119, the IF ports 112 and the FC fabrics 115. The initiator path lookup list 600 includes a coupled initiator list 601 and a pathway port list 602.

The coupled initiator list 601 is a list for managing the initiator apparatuses 119 coupled to the storage apparatus 101. The list 601 for example provides an initiator list index for each initiator apparatus 119 coupled to the storage apparatus 101, and maps to each initiator list index an initiator ID, an initiator port ID for an initiator port possessed by the initiator apparatus 119, a pointer indicating the start address of a pathway port list 602, and a pointer indicating the start address of the next initiator list index in this list 601.

The coupled port list 602 is a list for managing the FC ports 112 coupled to the initiator apparatus 119. The list 602 for example provides a pathway port index for each FC port 112 coupled to each initiator apparatus 119, and maps to each pathway port index a port number (#) identifying an FC port, a 'coupled fabric ID' identifying the FC fabric 115 coupled to said FC port, and a pointer indicating the start address of the next pathway port index in this list 602.

Figure 5:
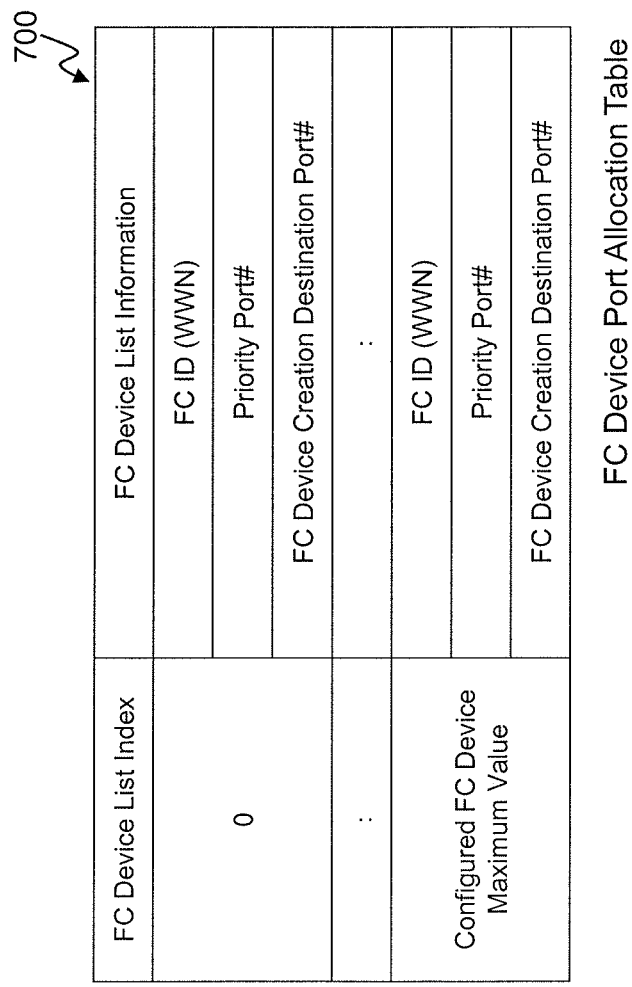
FIG. 5 is an FC device port allocation table 700.

FIG. 5 is an FC device port allocation table 700.

The FC device port allocation table 700 is a table for managing information relating to the FC devices 111.

The table 700 for example provides an FC device list index for each FC device 111 possessed by the storage apparatus 101, and for each FC device list index it has a WWN identifying an FC device, a priority port number (#) indicating a priority port which is an IF port which should be given the highest priority as the creation origin of said FC device, and an FC device creation destination port number (#) indicating an FC device creation destination port which is the current creation origin IF port of said FC device. It should be noted that in the initial state, each FC device should be created on the priority port.

A summary of the processes in example 1 will now be described with reference to FIG. 6 and FIG. 7.

Figure 6:
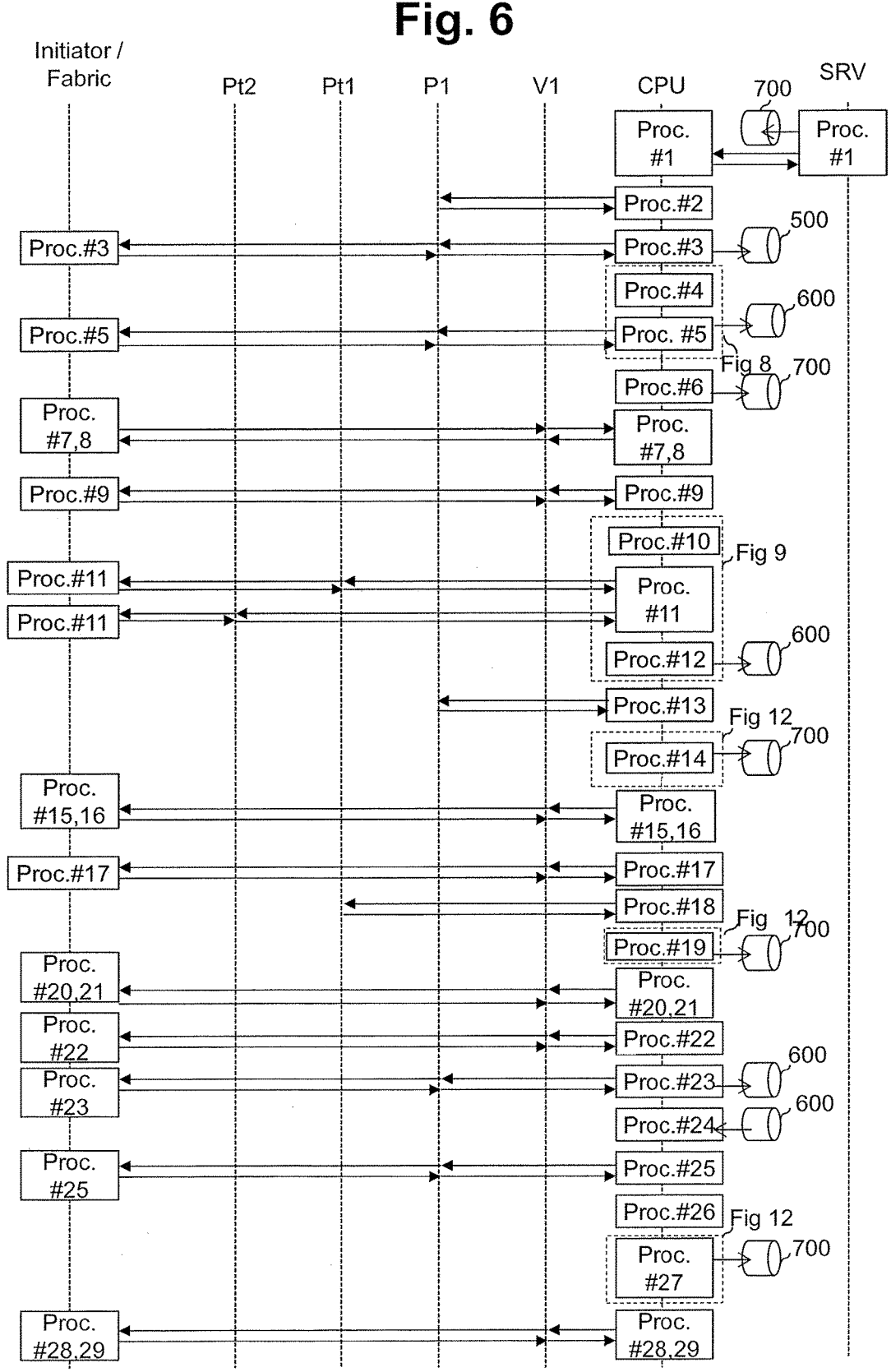
FIG. 6 is a sequence diagram illustrating the operation of the computer system according to example 1.

FIG. 6 is a sequence diagram illustrating the operation of the computer system according to example 1. FIG. 7 is a chart used to explain each process in the sequence in FIG. 6.

In these charts, the operating entity for each process is indicated using a reference code. The operating entities inside the storage apparatus 101 are as follows. CPU indicates the CPU 107. V1 indicates a specific FC device 111. P1 indicates an IF port 112 on which V1 is preferentially created. Pt1 indicates an IF port 112 which is a backup destination for V1 created on P1. Pt2 indicates an IF port 112 which is a migration destination for V1. Po indicates all of the IF ports 112 other than P1 that are operating in the storage apparatus 101. It should be noted that during initialization, V1 should be created on P1, and Pt1 and Pt2 may be configured arbitrarily. Further, the operating entities within the computer system, other than those described above, are as follows. SRV indicates the management apparatus 10. Initiator indicates an initiator apparatus 119, and Fabric indicates an FC fabric 115. In1 indicates a specific initiator apparatus 119, and F1 indicates a specific FC fabric 115.

Processes #1 to 12 are processes performed up to initial pathway establishment. Processes #13 to 17 are processes performed when a pathway failure occurs, up to a point at which a pathway is established when V1 has been backed up from P1 to Pt1. Processes #18 to 22 are processes performed when another pathway failure occurs, up to a point at which a pathway is established when V1 has been backed up from Pt1 to Pt2. Processes #23 to 29 are processes performed when P1 has recovered, up to a point at which a pathway is established when V1 has been restored to P1. An outline description of each process will now be given, in order.

Process #1 is a port configuration definition process. Here, an FC device is associated with each of its creation destination IF ports (P1 and Po) by CPU and SRV. An FC device port allocation table 700 discussed hereinafter is created by means of this process.

Process #2 is a port hardware (Port H/W) initialization process. Here, CPU initializes P1 and makes it operable.

Process #3 is a process to establish a port link. Here, CPU establishes a coupling (session) between P1 and F1, by making P1 login to F1. An association between F1 and P1 is registered in the fabric registration device list 500 by means of this operation.

Processes #4, 5 are pathway information gathering processes. When P1 logs into F1, in process #4 CPU recognizes the initiator apparatus 119 registered to F1, from among the initiator apparatuses 119 registered in the initiator path lookup list 600, by sending an inquiry to F1. In process #5, CPU maps P1 to the initiator apparatus coupled to F1, and registers this mapping. The initiator path lookup list 600 is updated by this process. Details of this process are discussed hereinafter.

Process #6 is an FC device creation process. Here, CPU performs the initial creation of V1. The FC device port allocation table 700 is updated by this process.

Processes #7, 8 are processes to establish an FC device link. In processes #7, 8, CPU makes V1 log into F1, and registers V1 in F1 by establishing a coupling between V1 and F1.

Process #9 is a process to establish an initiator pathway. Here, In1 logs into V1, and a coupling is established between In1 and V1.

Processes #10 to 12 are pathway information gathering processes. In process #10, CPU detects that In1 has logged into V1, and recognizes In1 by sending an inquiry to F1. In process #11, CPU recognizes the FC fabric coupled to In1 and Po. In process #12, CPU registers an association between In1, Po and the FC fabric in the fabric registration device list 500 and the initiator path lookup list 600. Details of this process are discussed hereinafter.

Processes #13, 14 are port switching processes. These processes are processes whereby, if a pathway failure has occurred due for example to a malfunction of P1, V1 created on P1 is backed up to another IF port. In process #13, CPU detects the F1 pathway failure. In process #14, CPU sets Pt1, which is the backup destination IF port for V1. The FC device port allocation table 700 is updated by this process. Details of this process are discussed hereinafter.

Processes #15, 16 are processes to establish an FC device link. In process #15, CPU makes V1, which has been backed up to Pt1, log into F1, and establishes a coupling between V1 and F1. In process #16, CPU re-registers V1 to F1.

Process #17 is a process to establish an initiator pathway. Here, when In1 logs into V1 and a coupling is established between In1 and V1, CPU detects this login.

Processes #18, 19 are port switching processes. These processes are processes whereby, if a pathway failure has occurred due for example to a malfunction of the IF port (Pt1), V1 created on Pt1 is migrated to another IF port. In process #18, CPU detects the F1 pathway failure. In process #19, CPU sets Pt2, which is the backup destination IF port for F1. The FC device port allocation table 700 is updated by this process. Details of this process are discussed hereinafter.

Processes #20, 21 are processes to establish an FC device link. In process #20, CPU makes V1, which has been backed up to Pt2, log into F1, and establishes a coupling between V1 and F1. In process #21, CPU re-registers V1 to F1 as an FC fabric.

Process #22 is a process to establish an initiator pathway. Here, when In1 logs into V1, CPU detects this login.

Processes #23 to 25 are IF port recovery processes. In process #23, CPU makes the recovered P1 log into F1, and establishes a coupling between P1 and F1. The initiator path lookup list 600 is updated by this process. In #24, CPU refers to the initiator path lookup list 600, and acquires initiator information indicating the initiator apparatus 119 coupled to the recovered P1. In #25, CPU refers to the initiator path lookup list 600, and acquires device registration information from F1, which is the coupling destination fabric for the recovered P1.

Process #26 is a port switching process. In process #26, CPU detects the state of the recovered P1. In process #27, CPU restores V1 onto the recovered P1. The FC device port allocation table 700 is updated by this process. Details of this process are discussed hereinafter.

Processes #27, 28 are processes to establish an FC device link. In process #27, CPU makes V1, which has been restored onto the recovered P1, log into F1, and establishes a coupling between V1 and F1. In process #28, CPU re-registers V1 to F1.

Figure 8:
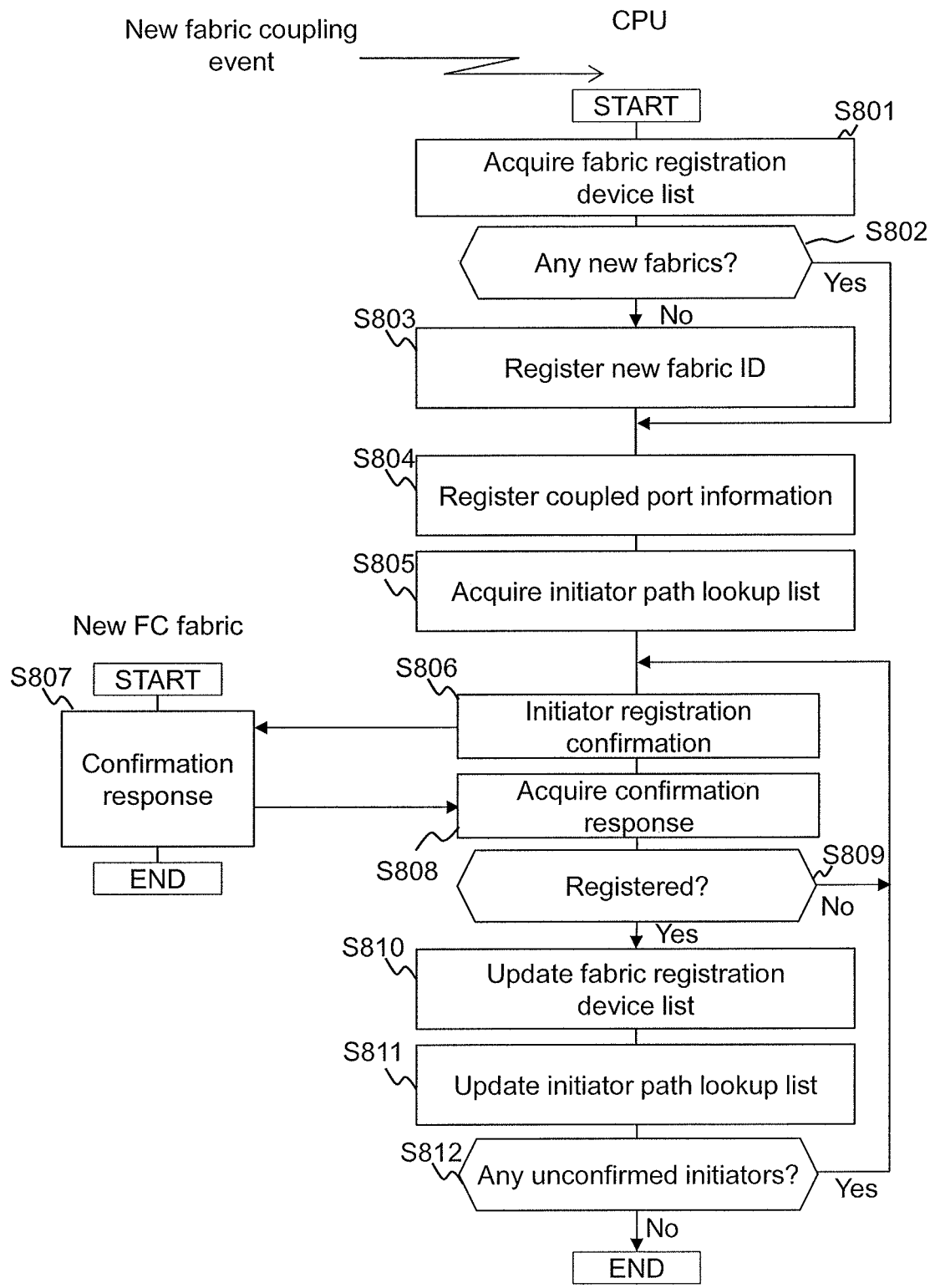
FIG. 8 is a flowchart of a pathway information gathering process performed when an FC fabric is coupled.

FIG. 8 is a flowchart of a pathway information gathering process performed when an FC fabric is coupled.

The pathway information gathering process is processes #4 and 5 in FIGS. 6 and 7. This process is performed by the CPU 107 of the storage apparatus 101 executing a first pathway information gathering program stored in the memory 109. Further, execution of the process is triggered when the CPU 107 detects an event indicating that an IF port 112 has logged into an FC fabric 115 (a coupling has been established). In the following explanation of the flow, the newly-coupled FC fabric 115 is referred to as the new fabric, and the IF port 112, which is the coupling destination of the new fabric, is referred to as the target port.

In S801, the program refers to the fabric registration device list 500 to determine whether or not the new fabric exists.

If the result of the determination is that the new fabric exists (Yes in S802), the program advances the process to S804. On the other hand, if the result of the determination is that the new fabric does not exist (No in S802), then in S803 the program registers the new fabric in the fabric registration device list 500. For example, the program registers information relating to the new fabric in the coupled fabric list 501.

In S804, the program registers information relating to the target port in the IF port list 503 corresponding to the new fabric.

In S805 the program acquires the initiator path lookup list 600.

In S806 the program refers to the initiator path lookup list 600, selects one initiator apparatus 119 as a target initiator apparatus, and makes an inquiry to determine whether or not the target initiator apparatus is registered to the new fabric. For example, the program transmits to the new fabric a registration confirmation request relating to the target initiator apparatus.

In S807, the new fabric receives the registration confirmation request, confirms whether or not the target initiator apparatus is its own coupling destination, and transmits the confirmation response to the program.

In S808 the program receives the confirmation response from the new fabric, and in S809 it determines, based on the confirmation response, whether or not the target initiator apparatus is registered to the new fabric.

If the result of the determination is that the target initiator apparatus is not registered (No in S809), the program sets the next one arbitrary initiator apparatus 119 as the target initiator apparatus, and returns the process to S806. On the other hand, if the result of the determination is that the target initiator apparatus is registered (Yes in S809), then in S810 the program registers in the fabric registration device list 500 the information relating to the target initiator apparatus, so that it corresponds to the new fabric.

In S811 the program registers the new fabric as pathway information of the target initiator apparatus, in the initiator path lookup list 600. More specifically, in the list 602 the program registers the new fabric in the 'coupled fabric identifier' field of the target port included in the pathway of the target initiator apparatus.

In S812 the program determines whether or not there are any initiator apparatuses 119 in the initiator path lookup list 600 that have not been subjected to registration confirmation in S806. If the result of the determination is that there are initiator apparatuses 119 that have not been subjected to registration confirmation (Yes in S812), the program sets the next one arbitrary initiator apparatus 119 as the target initiator apparatus, and returns the process to S806. On the other hand, if the result of the determination is that registration confirmation has been completed for all the initiator apparatuses 119 in the initiator path lookup list 600 (No in S812), the program ends the process.

By means of the abovementioned process, if an FC fabric 115 has been newly coupled to the storage apparatus 101, the pathway information containing the new fabric can be updated. More specifically, it is possible to acquire the information relating to the initiator apparatuses 119 and IF ports 112 that are coupled to the new fabric, and to register this information as pathway information.

Figure 9:
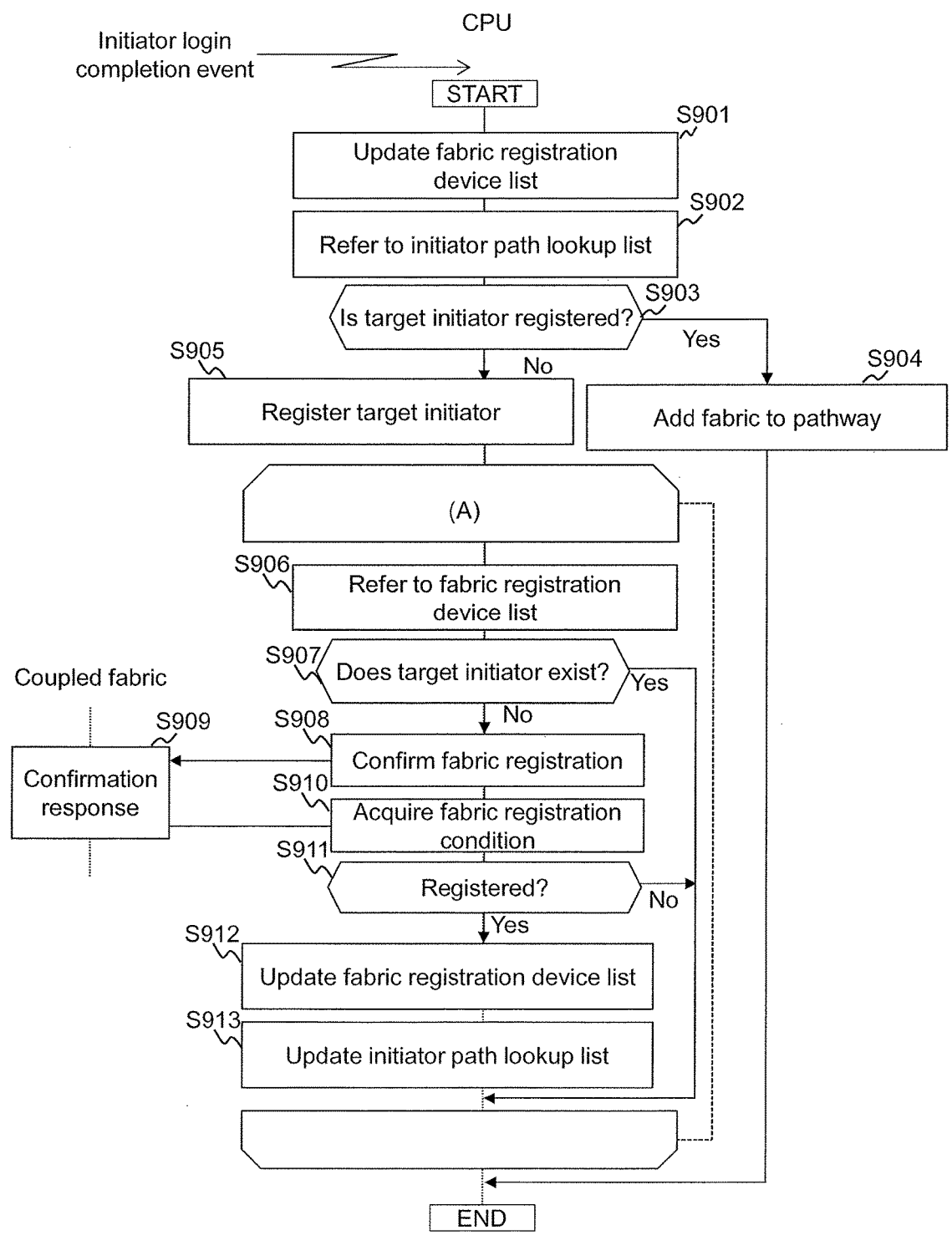
FIG. 9 is a flowchart of a pathway information gathering process performed when an initiator apparatus 119 has logged into an FC device 111.

FIG. 9 is a flowchart of a pathway information gathering process performed when an initiator apparatus 119 has logged into an FC device 111.

The pathway information gathering process is processes #10 to 12 in FIGS. 6 and 7. This process is performed by the CPU 107 of the storage apparatus 101 executing a second pathway information gathering program stored in the memory 109. Further, execution of the process is triggered when the CPU 107 detects an event indicating that an initiator apparatus 119 has completed a login to an FC device 111. In the following explanation of the flow, the FC fabric 115 on the pathway established by virtue of this login is referred to as the target fabric, the initiator apparatus 119 that performed the login is referred to as the target initiator apparatus, and the IF port corresponding to the FC device 111 that was logged into is referred to as the coupled port.

In S901 the program registers the information of the target initiator apparatus in the fabric registration device list 500. More specifically, it registers the information of the target initiator apparatus in the initiator list 502 corresponding to the target fabric.

In S902 the program refers to the initiator path lookup list 600, and in S903 it determines whether or not the target initiator apparatus has already been registered in the initiator path lookup list 600. Here, a situation in which the target initiator apparatus has already been registered in the initiator path lookup list 600 is defined as being a situation in which a coupled port has already been mapped to the target initiator apparatus.

If the result of the determination is that the target initiator apparatus has been registered (Yes in S903), the program registers the target fabric in the pathway of the target initiator apparatus in the initiator path lookup list 600 (S904), and ends the process. More specifically, in the pathway port list 602 the program registers the target fabric in the 'coupled fabric identifier' field of the target port. On the other hand, if the result of the determination is that the target initiator has not been registered (No in S903), then in S905 the program updates the initiator path lookup list 600. More specifically, for example the program registers the target initiator apparatus in the coupled initiator list 601, registers the coupled port in the coupled port list 602 corresponding to the target initiator apparatus, and registers the target fabric in the 'coupled fabric identifier' field of the target port. The process is advanced to (A).

By referring to the initiator configuration list stored in the memory 107, the program sequentially selects one IF port 112 as a target port, from all the IF ports 112 of the storage apparatus 101 other than the coupled port, and for each target port it performs the following processes S906 to S913 (A). It should be noted that the initiator configuration list is a list (which is not shown in the drawings) for looking up, from all the IF ports 112 possessed by the storage apparatus 101, the initiator apparatuses 119 coupled thereto. It should be noted that an FC fabric which is logged into (coupled to) the target port is referred to as a coupled fabric.

In S906, the program refers to the fabric registration device list 500 to determine whether or not the target initiator apparatus exists in the initiator list 502 corresponding to the coupled fabric.

If the result of the determination is that the target initiator apparatus exists (Yes in S907), the program selects the next target initiator apparatus, and returns the process to S906. On the other hand, if the result of the determination is that the target initiator apparatus does not exist (No in S907), the program advances the process to S908.

In S908, the program makes an inquiry to determine whether or not the target initiator apparatus is registered to the coupled fabric. For example, the program transmits to the coupled fabric a coupled confirmation request relating to the target initiator apparatus.

In S909, the coupled fabric receives the coupled confirmation request, confirms whether or not the target initiator apparatus is registered as its own coupling destination, and transmits the confirmation response to the program.

In S910 the program receives the confirmation response from the coupled fabric and determines, based on the confirmation response, whether or not the target initiator apparatus is registered to the coupled fabric.

If the result of the determination is that the target initiator apparatus is not registered (No in S911), the program selects the next target port, and returns the process to S906.

On the other hand, if the result of the determination is that the target initiator apparatus is registered (Yes in S911), then in S912 the program updates the fabric registration device list 500. More specifically, for example, the program registers the information of the target initiator apparatus corresponding to the coupled fabric in the fabric registration device list 500. Then in S913 the program updates the initiator path lookup list 600. More specifically, for example, the program registers the coupled port corresponding to the target initiator apparatus in the list 600, and registers the coupled fabric in the 'coupled fabric identifier' field of the coupled port.

By means of the abovementioned process, if a target initiator apparatus has logged into an FC device 111 it is possible to associate the target initiator apparatus and the coupled port with the target fabric. In particular, if the target initiator apparatus was not already registered with the storage apparatus 101, the target initiator apparatus, the coupled port and the target fabric can be associated together and registered.

Further, if the target initiator is coupled to a port other than the coupled port, then that port and the fabric coupled to said port can be associated with the target initiator apparatus and registered. By this means it is possible to acquire all of the selectable pathway information that includes ports other than the coupled port and includes the target initiator. By this means, other pathways that include the target initiator can be included as options for a switching destination pathway if the coupled port malfunctions.

Further, by storing in the storage apparatus 101 the fabric registration device list 500 and the initiator path lookup list 600 created in the abovementioned process, and the FC device port allocation table 700, even if for example a failure occurs in a pathway between an initiator apparatus and an FC fabric due to a malfunction of a physical device such as an IF port, it is possible to switch to a pathway containing another IF port while maintaining communications between the initiator apparatus and the FC fabric. By this means the target initiator can continue to access the target FC device. The IF port can for example be switched using virtualization technology such as NPIV.

It should be noted that in S903 in the abovementioned process, a situation in which the target initiator apparatus was not already registered in the initiator path lookup list 600 was described as being a situation in which a coupled fabric was already mapped in the list 600 to the target initiator apparatus, but it is not limited to this. It is also possible to include as a situation in which the target initiator apparatus was not registered in the initiator path lookup list 600, a situation in which, for example, the target initiator apparatus has established a pathway including an FC fabric 115 other than the target fabric (the established pathway), and said established pathway is reflected in the initiator path lookup list 600. In this case, in S904 the port included in the established pathway is registered by the program in the pathway port list 602 corresponding to the target initiator apparatus in the initiator path lookup list 600, and the program registers the target fabric in the 'coupled fabric identifier' field for said port and ends the process.

Figure 10:
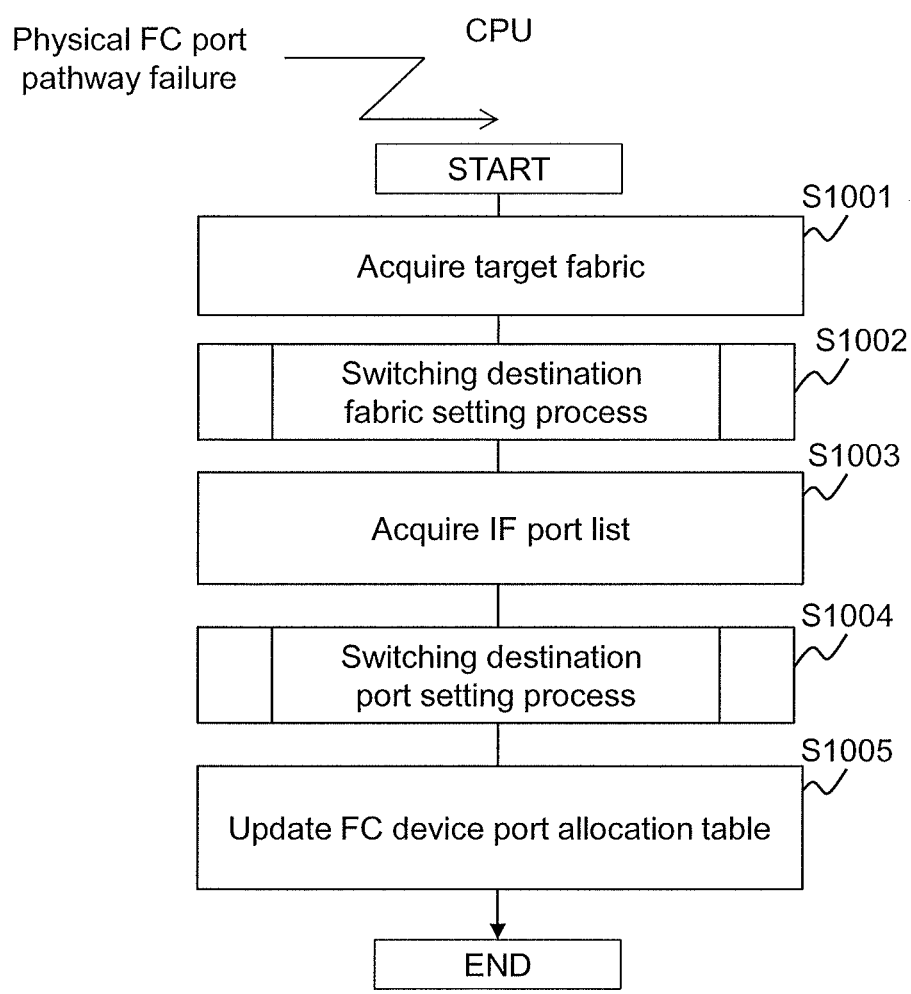
FIG. 10 is a flowchart of a port switching process.

FIG. 10 is a flowchart of a port switching process.

The port switching process is processes #13 and 14, #18 and 19, and #26 and 27 in FIGS. 6 and 7. This process is performed by the CPU 107 of the storage apparatus 101 executing a port switching control program stored in the memory 109. Processes #13 and 14 will be described in the following explanation, as being representative of these processes. Execution of the process is triggered when the CPU 107 detects a pathway failure. It should be noted that the pathway failure is assumed to be a situation involving a failure of a physical device, such as an IF port malfunction. In the following explanation of the flow, the IF port 112 in which a failure has been detected is referred to as the failed port. The FC device 111 created on the failed port is referred to as the target FC device.

In S1001 the program refers to the fabric registration device list 500 and acquires information of the target fabric, which is the FC fabric 115 to which the failed port is coupled.

In S1002 the program performs a switching destination fabric setting process. Details of this process are discussed hereinafter. In this process, the FC fabric 115 which has been set is referred to as the switching destination fabric.

In S1003 the program acquires the IF port list 503 of the IF port coupled to the switching destination fabric.

In S1004 the program performs a switching destination port setting process. Details of this process are discussed hereinafter. It should be noted that in this process, the IF port 112 which has been set is referred to as the switching destination port.

In S1005 the program updates the FC device creation port allocation table 700. More specifically, for example, the program registers the switching destination port in the 'FC device creation destination physical port number' field corresponding to the target FC device, in the FC device creation port allocation table 700. It should be noted that after this, the program may notify the initiator apparatus 119 included in the failed pathway, or the switching destination fabric, that the failed pathway is being switched to another pathway.

In the abovementioned process, if a failure has occurred in the pathway between the target initiator apparatus and the storage apparatus 101 due to a malfunction of a physical device such as an IF port 112 included in the failed pathway, the storage apparatus 101 possessing the malfunctioning physical device can automatically set an appropriate physical device to serve as an alternative for the physical device in which the pathway failure has occurred. More specifically, it can automatically set, as an alternative pathway to the failed pathway, another pathway between the target FC device created on the failed port and the target initiator apparatus. By this means the target initiator can continue to access the target FC device. The IF port can for example be switched using virtualization technology such as NPIV.

It should be noted that the situation in processes #13 and 14 was described above. Processes #18 and 19 are similar to the situation described hereinabove in that a pathway failure is detected. Further, processes #26 and 27 are processes performed to recover the original pathway when the physical device which caused the pathway failure has recovered. Thus in processes #26 and 27, the failed port in the abovementioned explanation is the switching destination port, and the switching destination port in the abovementioned explanation is the failed port.

Figure 11:
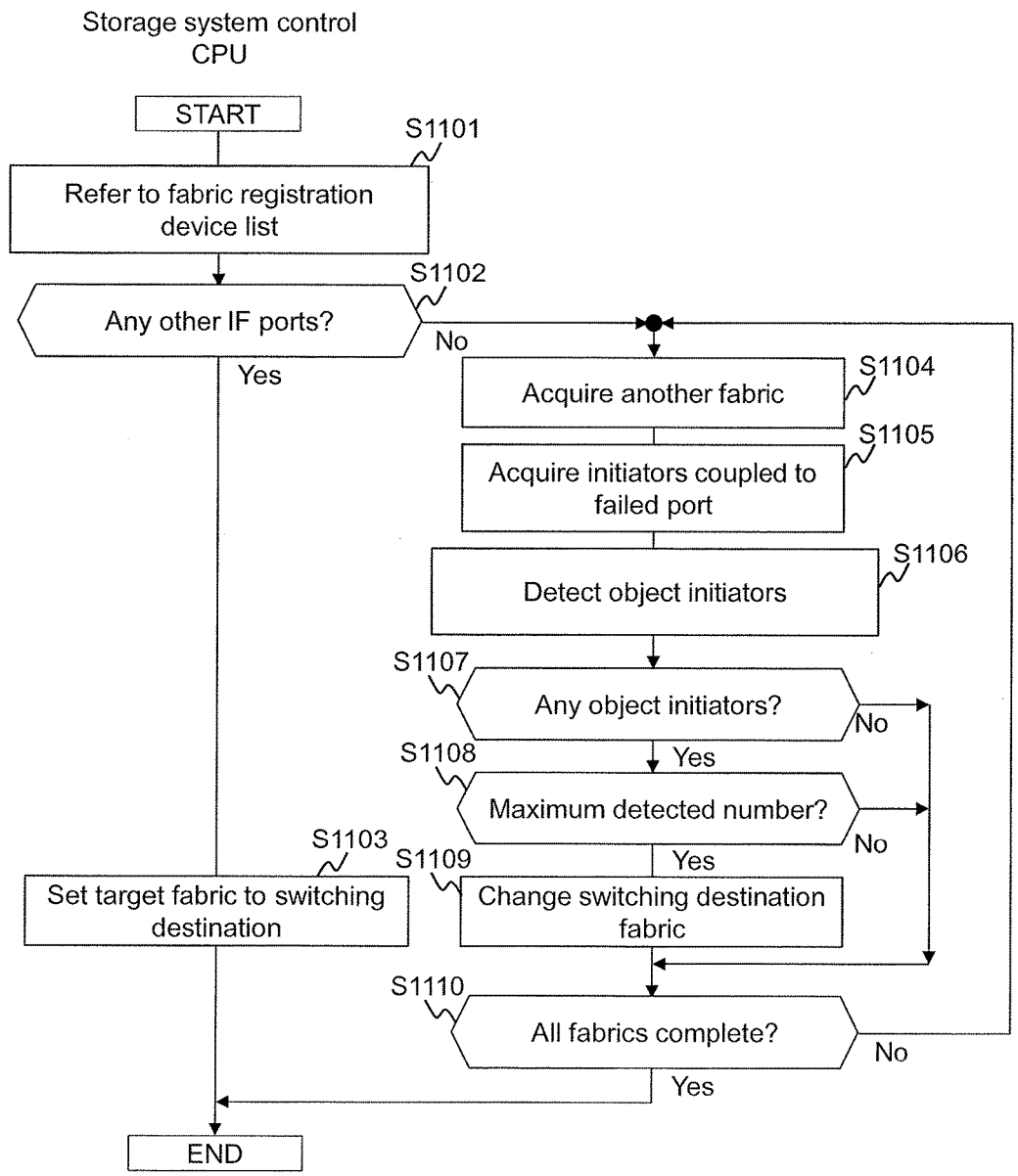
FIG. 11 is a flowchart of a switching destination fabric setting process.

FIG. 11 is a flowchart of the switching destination fabric setting process.

The switching destination fabric setting process is the process in S1002 in FIG. 10. In the following explanation of the flow, the IF port 112 in which a failure has been detected is referred to as the failed port, and the FC fabric 115 to which the failed port is coupled is referred to as the target fabric.

In S1101, the program refers to the fabric registration device list 500 to determine whether or not an IF port 112 other than the failed port is coupled to the target fabric.

If the result of the determination is that an IF port 112 other than the failed port is coupled to the target fabric (Yes in S1102), then in S1103 the program sets the target fabric as the switching destination fabric. On the other hand, if no IF port 112 other than the failed port is coupled to the target fabric (No in S1102), then the program advances the process to S1104.

In S1104, the program refers to the fabric registration device list 500, and selects one FC fabric 115 other than the target fabric as a candidate fabric. It should be noted that S1104 to S1109 are performed for each candidate fabric.

In S1105 the program refers to the initiator configuration list, and selects as coupled initiator apparatuses the initiator apparatuses 119 that were coupled to the failed port. Here, the initiator configuration list is a list (which is not shown in the drawings) with which the storage apparatus 101 can look up the initiator apparatuses 119 coupled to an IF port 112, using the IF port 112 as a key.

In S1106 the program detects, as object initiators, all of the initiator apparatuses 119 that were coupled to the failed port via the target fabric, from among the initiator apparatuses 119 coupled to the candidate fabric, based on the initiator list 502 corresponding to the candidate fabric selected in S1104 and the coupled initiator apparatuses 119 selected in S1105.

In S1107 the program determines whether or not an object initiator was selected in S1106. If the result of the determination is that an object initiator was not selected (No in S1107), the program advances the process to S1110. On the other hand, if the result of the determination is that an object initiator was selected (Yes in S1107), the program advances the process to S1108.

In S1108 the program determines whether or not the number of object initiators of the selected candidate fabric is a maximum number compared with the number of object initiators of candidate fabrics hitherto detected in S1107. If the result of the determination is that the number of object initiators of the candidate fabric is a maximum (Yes in S1110), then in S1109 it sets the candidate FC fabric as the switching destination fabric. It should be noted that when this step is performed for the first candidate fabric, said candidate fabric becomes the switching destination fabric. Further, if a switching destination fabric already exists, the number of object initiators is compared between the switching destination fabric and the candidate fabric, and the FC fabric having the larger number is set as the switching destination fabric. On the other hand, if the result of the determination is that the number of object initiators selected is not a maximum (No in S1110), the process advances to S1110.

In S1110 the program refers to the fabric registration device list 500 to determine whether or not the processes S1104 to 1109 have been completed for all the candidate fabrics. If the result of the determination is that the processes have been completed for all the candidate fabrics (Yes in S1110), the program ends the process. On the other hand, if the result of the determination is that there are candidate fabrics for which processing has not been completed (No in S1110), the program advances the process to S1104.

By means of the abovementioned processes it is possible to set a switching destination fabric, which is a candidate switching destination pathway to which a pathway in which a failure has occurred or which has recovered is to be switched. Further, as the order of priority for setting the switching destination fabric, if another IF port 112 is coupled to the target initiator apparatus, then the target fabric has highest priority, and if another IF port 112 is not coupled to the target fabric then an FC fabric coupled to another initiator apparatus 119 that is coupled to the target fabric can be selected. Also, in this case, from among the FC fabrics coupled to other initiator apparatuses 119 that are coupled to the target fabric, the FC fabric 115 for which the number of detected object initiators is maximal can be set preferentially as the switching destination fabric. When setting the switching destination fabric, by preferentially selecting the target fabric, the target initiator apparatus can continue to make access, without being aware that the FC fabric 115 has been switched. Also, by selecting an FC fabric 115 having a large number of object initiators, many pathway options can be set within a single FC fabric 115.

Figure 12:
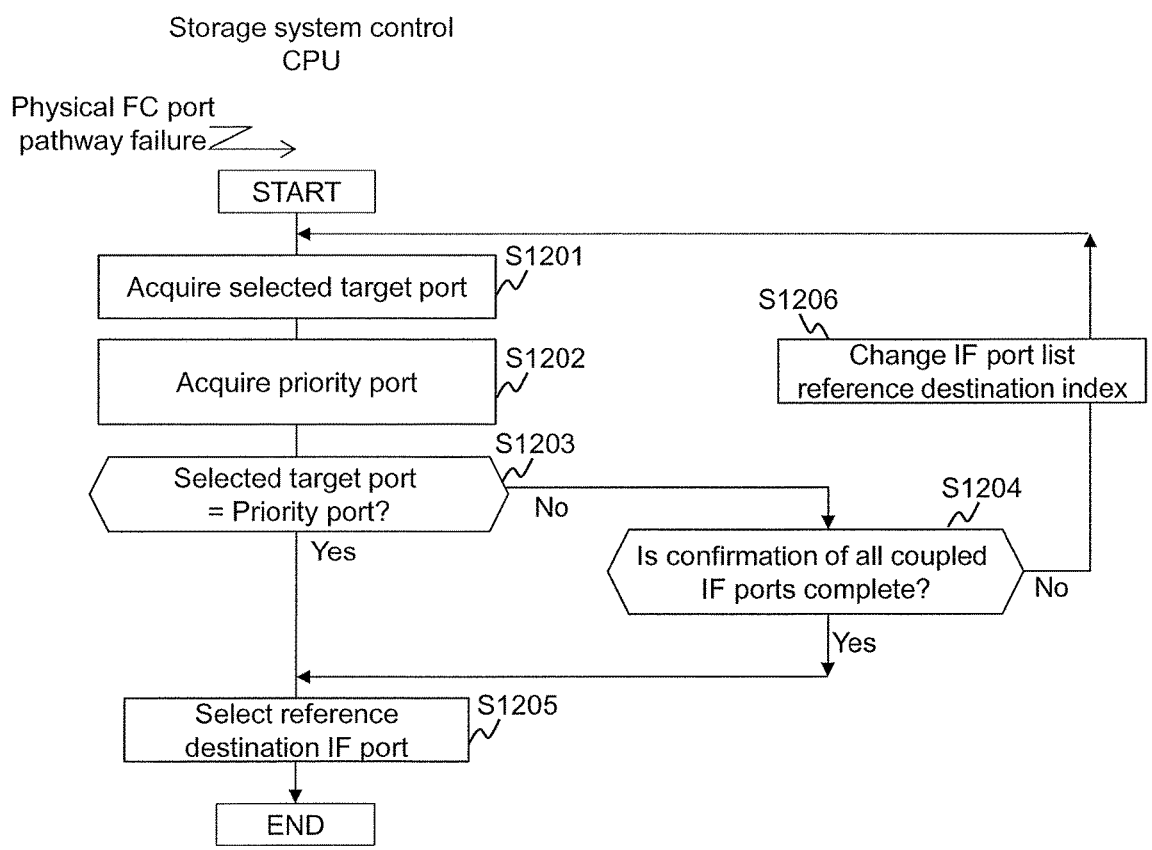
FIG. 12 is a flowchart of a switching destination port setting process.

FIG. 12 is a flowchart of the switching destination port setting process.

The switching destination port setting process is the process in S1004 in FIG. 10.

In S1201, the program refers to the port list 503 corresponding to the switching destination fabric, acquired in S1003 of the port switching process, and selects one IF port 112 as a selected target port.

In S1202 the program refers to the FC device port allocation table 700 and acquires the priority port numbers for all the FC devices.

In S1203 the program determines whether or not there is an IF port 112 that satisfies the following conditions, namely that it is the priority port for any of the FC devices 111 and that it is the selected target port. If the result of the determination is that there is an IF port that satisfies these conditions (Yes in S1203), then in S1205 the program sets the IF port satisfying the conditions as a reference destination port and ends the process. It should be noted that at this time the FC device 111 for which the reference destination port is the priority device should be set as the switching destination FC device.

On the other hand, if the result of the determination is there is no IF port satisfying the conditions (No in S1203), the program advances the process to S1204.

In S1204 the program determines whether or not S1203 has been performed for all the IF ports 112 in the port list 503. If the result of the determination is that all the IF ports have not been completed (No in S1204), the next selected target port in the port list 503 is selected and the process returns to S1201. On the other hand, if the result of the determination is that all the IF ports have been completed (Yes in S1204), then in S1205 the program sets the selected target port as the reference destination port and ends the process. It should be noted that the program may for example set, as the reference destination port, the IF port 112 used as the selected target port the last time S1203 was performed. Also, the program should set one arbitrary FC device as the switching destination FC device.

By means of the abovementioned process, an IF port coupled to the switching destination fabric can be set as the reference destination port. Further, from among the IF ports coupled to the switching destination fabric, if there is an IF port 112 which is set as the priority port for an FC device 111, it can be set preferentially as the reference destination port. By this means, when the failed pathway recovers, the FC device 111 contained in the failed pathway can be mapped to the IF port 112.

Figure 13:
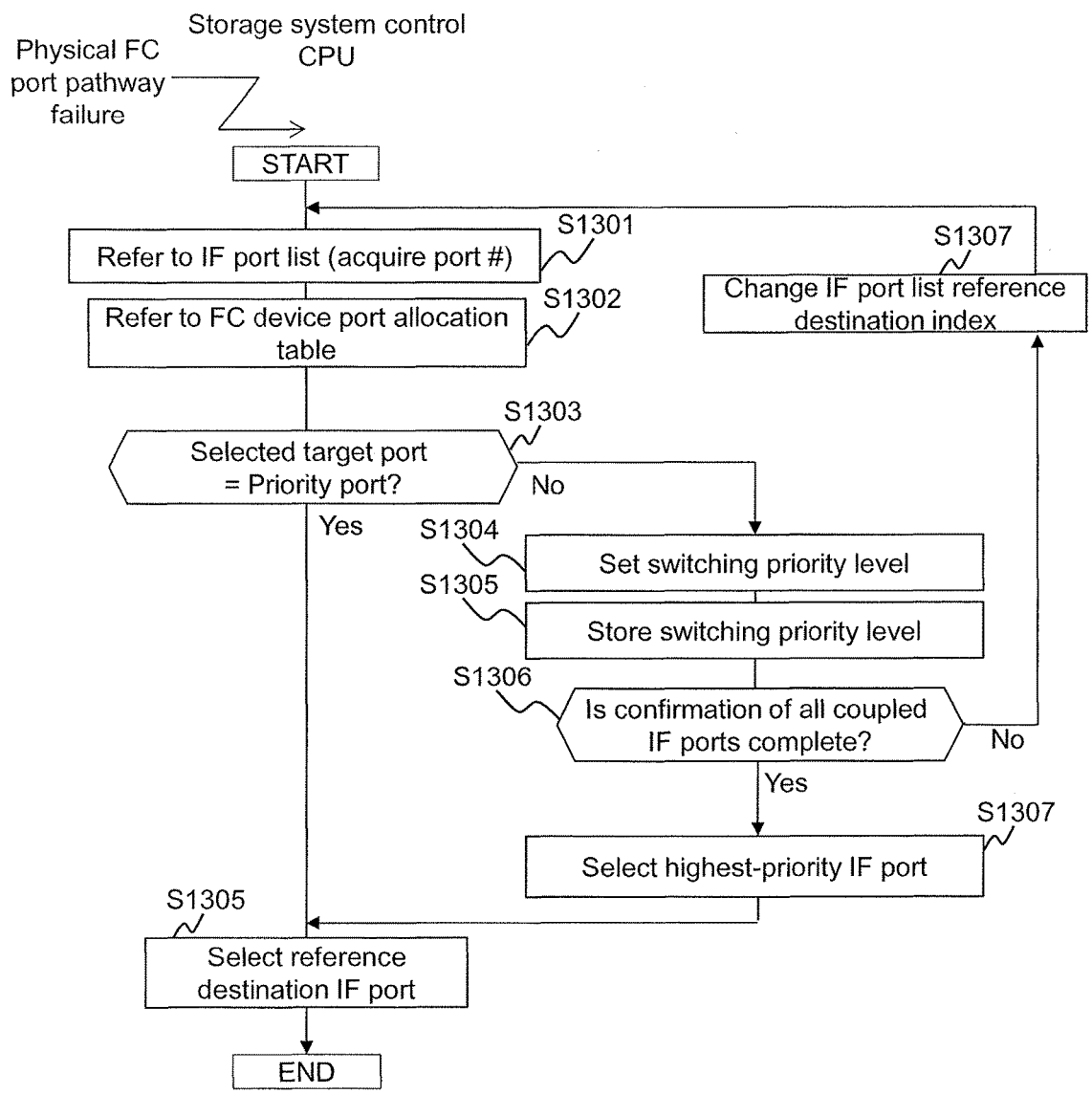
FIG. 13 is a flowchart illustrating a modified example of a switching destination port setting process.

FIG. 13 is a flowchart illustrating a modified example of a switching destination port setting process. The switching destination port setting process is the process in S1004 in FIG. 10.

In S1301, the program refers to the port list 503 corresponding to the switching destination fabric, acquired in S1003 of the port switching process, and selects one IF port 112 as a selected target port.

In S1302 the program refers to the FC device creation port allocation table 700 and acquires the priority port numbers for all the FC devices.

In S1303 the program determines whether or not there is an IF port 112 that satisfies the following conditions, namely that it is the priority port for any of the FC devices 111 and that it is the selected target port. If the result of the determination is that there is an IF port that satisfies these conditions (Yes in S1303), then in S1305 the program sets the IF port satisfying the conditions as a reference destination port and ends the process. It should be noted that in this process, the FC device 111 for which the reference destination port is the priority device may be set as the switching destination FC device.

On the other hand, if the result of the determination is there is no IF port satisfying the conditions (No in S1303), the program advances the process to S1304.

In S1304 the program refers to port control information, which is not shown in the diagram, and sets, for the selected target port, a switching priority level to be used when IF port switching occurs. Here, the port control information is information used to set the switching priority level. The port control information includes, for example, bandwidth utilization information, multipath device group information, ALUA path priority level information and the like. Bandwidth utilization information is information indicating the bandwidth loading for each path, such as MB/s (megabytes per second), IOPS (Input/Output Per Second) or the like. For example, if, based on this information, the selected target port is an IF port contained in a path having a low bandwidth utilization, the program sets it as a high priority-level IF port. Multipath device group information is, for example, information with which paths which are redundant as seen from the initiator apparatus 119 are managed as a group. For example, if, based on this information, the selected target port is an IF port belonging to the same group, the program sets it as a high priority-level IF port. ALUA path priority level information is, for example, information used to manage the priority level of each LU device 106. For example, if, based on this information, the selected target port is an IF port contained in a path having a high priority-level LU device 106, the program sets it as a high priority-level IF port.

In S1305 the program stores in the memory 109 the priority level of the selected target port set in S1304.

In S1306 the program determines whether or not S1303 has been performed for all the IF ports 112 in the port list 503. If the result of the determination is that all the IF ports have not been completed (No in S1306), the next selected target port in the port list 503 is selected and the process returns to S1301. On the other hand, if the result of the determination is that processing has been completed for all the IF ports (Yes in S1306), the program selects the IF port having the highest priority level (S1307), sets this IF port as the reference destination port (S1305), and ends the process.

By means of the abovementioned process, if, from among the IF ports coupled to the switching destination fabric, there is an IF port 112 which is set as the priority port for an FC device 111, it can be set preferentially as the reference destination port. In addition, if there is not an IF port 112 which is set as the priority port for an FC device 111, the reference destination port can be set in accordance with priority levels based on the port control information.

EXAMPLE 2

Example 2 will now be described. The explanation of example 2 will mainly cover the points of difference compared with example 1, and explanations of points which are common with example 1 will be omitted or simplified.

Figure 14:
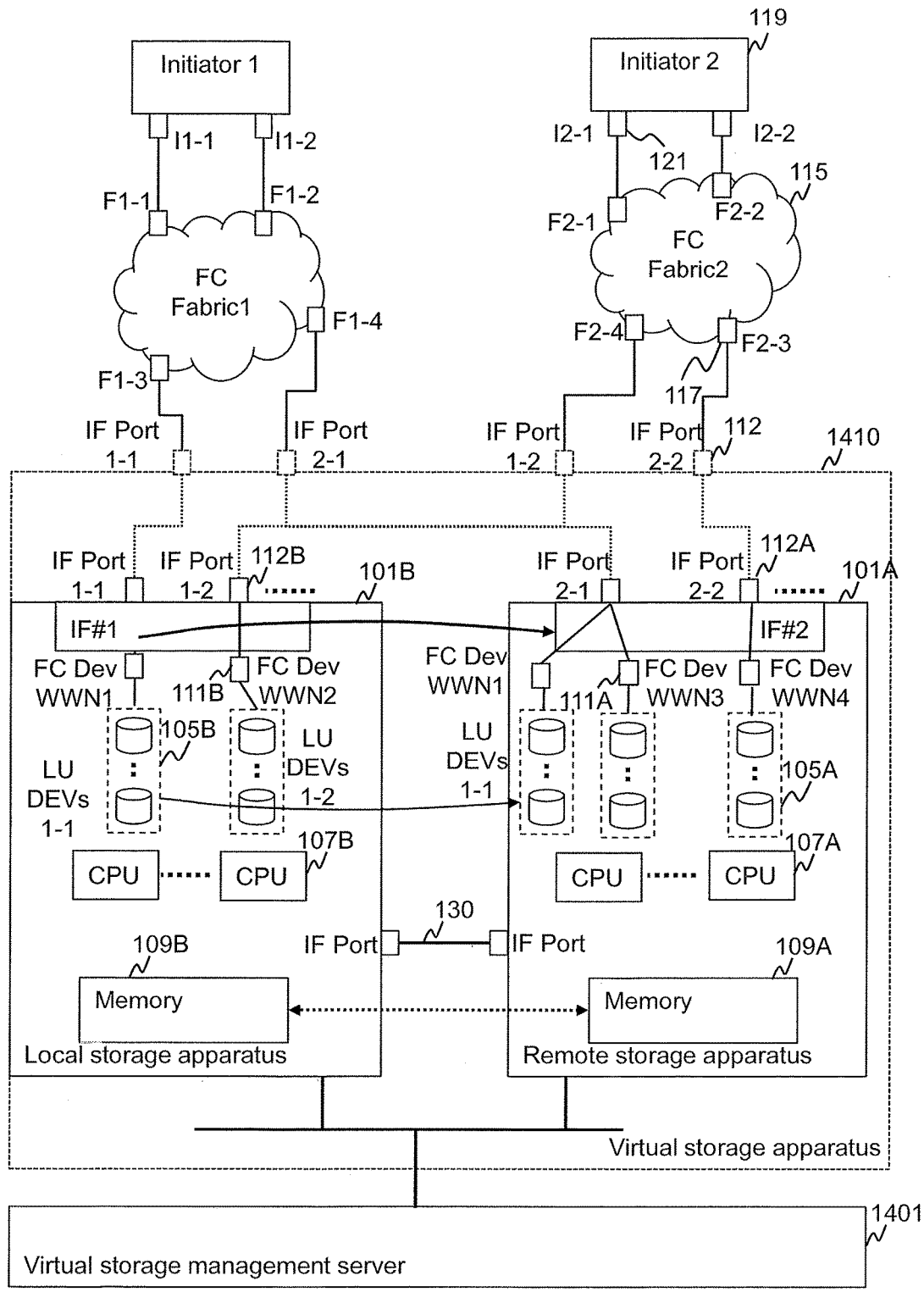
FIG. 14 is a summary of the computer system according to example 2.

FIG. 14 is a summary of a computer system according to example 2.

In the computer system in this example, a virtual storage apparatus 1410 offered by means of a plurality of storage apparatuses 101A and 101B is coupled to one or more initiator apparatuses 119 via one or more FC fabrics 115. The configuration of storage apparatuses 101A, 101B is identical or similar to the storage apparatus 101 in example 1.

Memories 109A, 109B of each storage apparatus 101A, 101B each store programs and various types of information within the computer system. A fabric registration device list 1500, an initiator path lookup list 1600, an FC device port allocation table 1700, a pathway information gathering program, a pathway information sharing program, a virtual storage port switching control program and the like are stored in each memory 109A, 109B, for example. Initiator configuration lists are also for example stored in each memory 109A, 109B. The initiator configuration list comprises information relating to the initiator apparatuses 119 that are coupled to each IF port 112 possessed by the virtual storage apparatus 1401.

The virtual storage apparatus 1410 has a plurality of storage apparatuses 101, 101B which are coupled to each other via a network 130, and a virtual storage management server 1401 which is coupled to the storage apparatuses 101A, 101B. By virtue of the fact that the virtual storage management server 1401 controls the storage apparatuses 101, 101B, the virtual storage apparatus 1410 is recognized by the initiators 119 and the FC fabrics 115 as a single storage apparatus.

By means of the abovementioned configuration, pathways which effect communications between the initiator apparatuses 119 and the virtual storage apparatus 1410 contain an FC fabric 115, an IF port 112 possessed by the virtual storage apparatus 1410, and an FC device 111 allocated to the IF port 112. The plurality of storage apparatuses 101 constituting the virtual storage apparatus 1410 acquires and maps information relating to the devices contained in each pathway, and stores this information in the respective memories 107 as pathway information. This information is shared and regularly or irregularly synchronized by each storage apparatus 101A, 101B.

Also, if a pathway is cut off due to a malfunction of a physical device (for example an IF port 112), the virtual storage apparatus 1410 detects the malfunctioning physical device and switches it over to another physical device contained in another pathway that communicates with the initiator apparatus 119. The virtual storage apparatus 1410 in the present example can include as the switching destination target for the malfunctioning physical device, physical devices possessed by a different storage apparatus from the storage apparatus having the malfunctioning physical device (for example an IF port 112).

Figure 15:
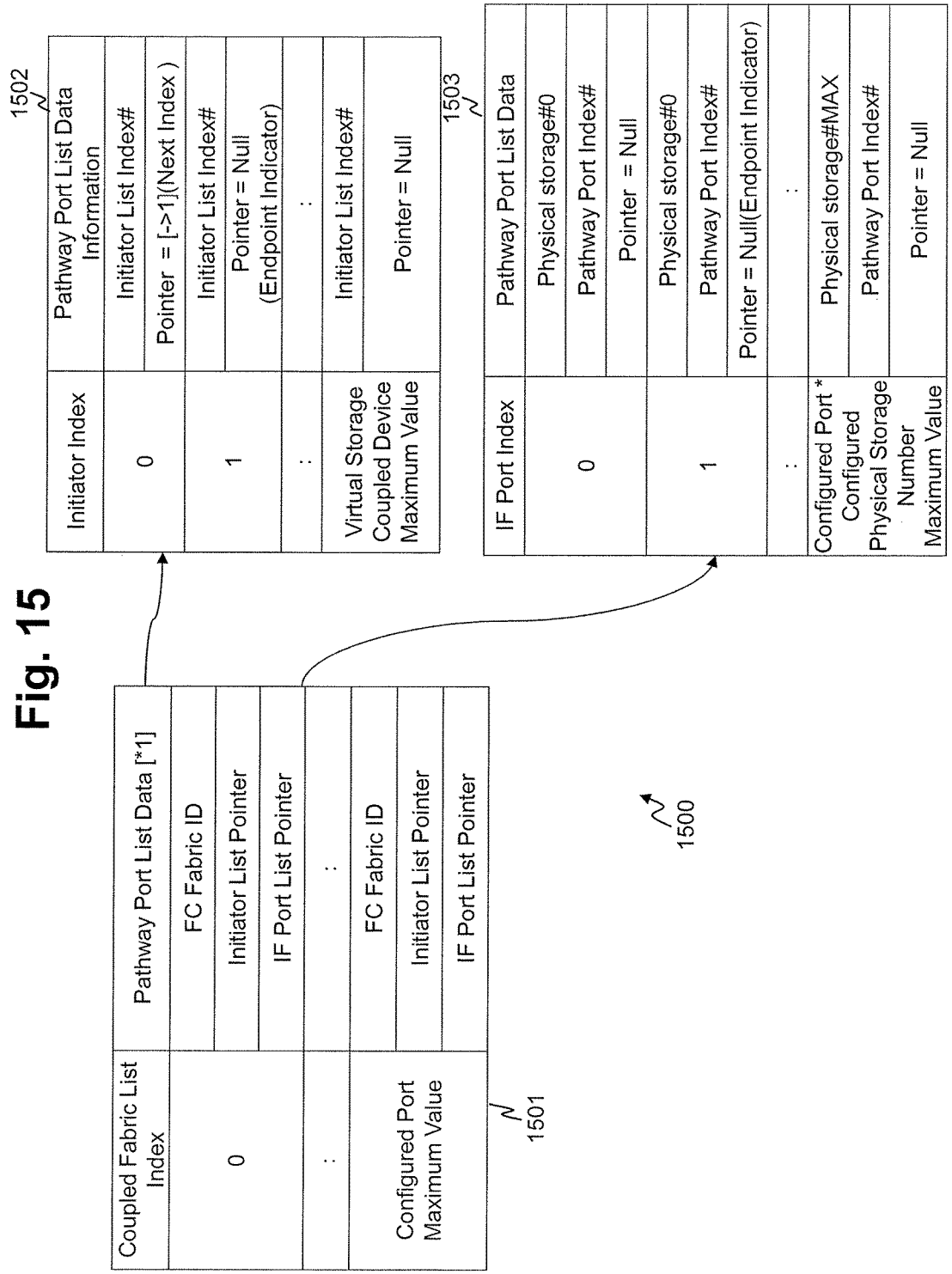
FIG. 15 is a fabric registration device list 1500 of example 2.

FIG. 15 is a fabric registration device list 1500 of example 2.

The fabric registration device list 1500 of the present example is a list for looking up the initiator apparatuses 119 and the IF ports 112 coupled to each FC fabric 115, for all FC fabrics 115 coupled to the virtual storage apparatus 1410. The fabric registration device list 500 comprises information relating to the pathways between the FC fabrics 115, the initiators 119 and the IF ports 112. The fabric registration device list 1500 includes a coupled fabric list 1501, an initiator list 1502 and an IF port list 1503.

The coupled fabric list 501 is a list for managing the FC fabrics 115 coupled to the virtual storage apparatus 1410. The configuration of the list 501 is similar to that of the coupled fabric list 501 in example 1.

The initiator list 502 is a list for managing the initiator apparatuses 119 that are coupled to each FC fabric 115 coupled to the virtual storage apparatus 1410. The configuration of the list 502 is the same as that of the initiator list 502 in example 1.

The IF port list 503 is a list for managing the IF ports 112 that are coupled to each FC fabric 115 coupled to the virtual storage apparatus 1410. In the list 503 in the present example, a pointer indicating a physical storage number (#) indicating the physical storage apparatus 101 to which the corresponding IF port 112 belongs is mapped to each IF port index, but other aspects of the configuration are the same as in the IF port list 503 of example 1.

FIG. 16 is an initiator path lookup list 1600 of example 2.

The initiator path lookup list 1600 of the present example is a list for looking up, from each initiator apparatus 119, the IF ports 112 and the FC fabrics 115 coupled to the IF ports 112, for all initiator apparatuses 119 coupled to the virtual storage apparatus 1410. The initiator path lookup list 1600 comprises information relating to the pathways between the initiators 119, the IF ports 112 and the FC fabrics 115. The initiator path lookup list 1600 includes a coupled initiator list 1601 and a pathway port list 1602.

The coupled initiator list 1601 is a list for managing the initiator apparatuses 119 coupled to the virtual storage apparatus 1410. The configuration of the list 1601 is the same as that of the coupled initiator list 601 in example 1.

The coupled port list 1602 is a list for managing the FC ports 112 that are coupled to each initiator apparatus 119 coupled to the virtual storage apparatus 1410. In the list 1602 in the present example, a pointer indicating a physical storage number (#) indicating the physical storage apparatus 101 to which the corresponding IF port 112 belongs is mapped to each IF port index, but other aspects of the configuration are the same as in the coupled initiator list 602 of example 1.

Figure 17:
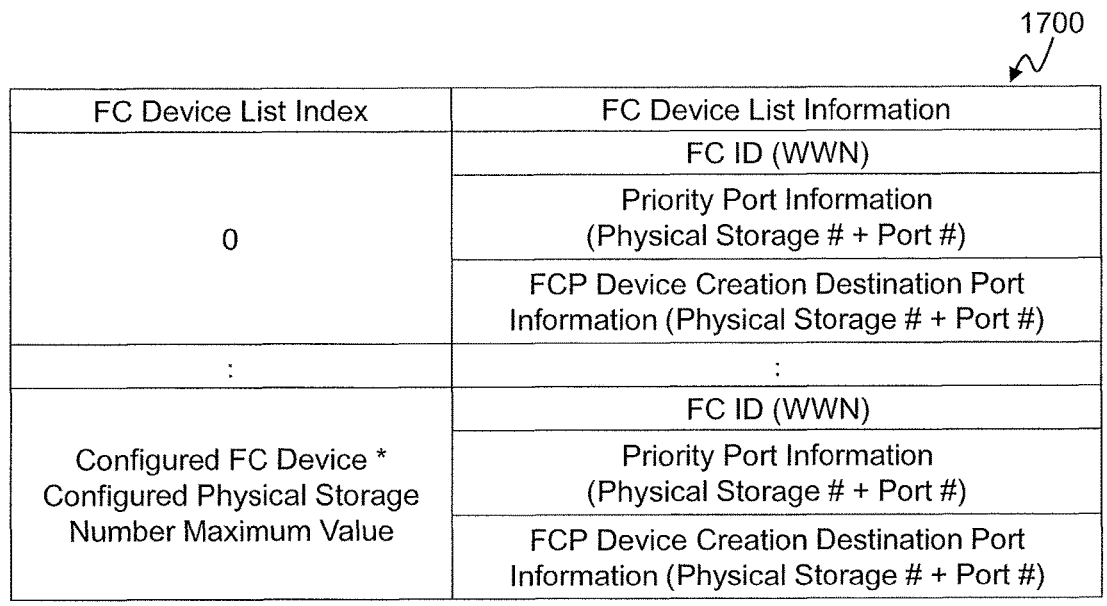
FIG. 17 is an FC device port allocation table 1700 of example 2.

FIG. 17 is an FC device port allocation table 1700 of example 2.

The FC device port allocation table 1700 is a table for managing information relating to the FC devices 111 possessed by the virtual storage apparatus 1410.

The table 1700 has essentially the same configuration as the FC device port allocation table 700 in example 1. However, the FC device port allocation table 1700 of the present example uses, as priority port information, information relating to the IF port that should be given the highest priority as the creation origin of said FC device, and registers a physical storage apparatus number (#) and an IF port number (#), and it uses, as an FC device creation destination port, information relating to the current creation origin IF port of said FC device, and registers a physical storage apparatus number (#) and an IF port number (#). It should be noted that in the initial state, each FC device should be created on the priority port.

It is re-registered as 1.

Figure 18:
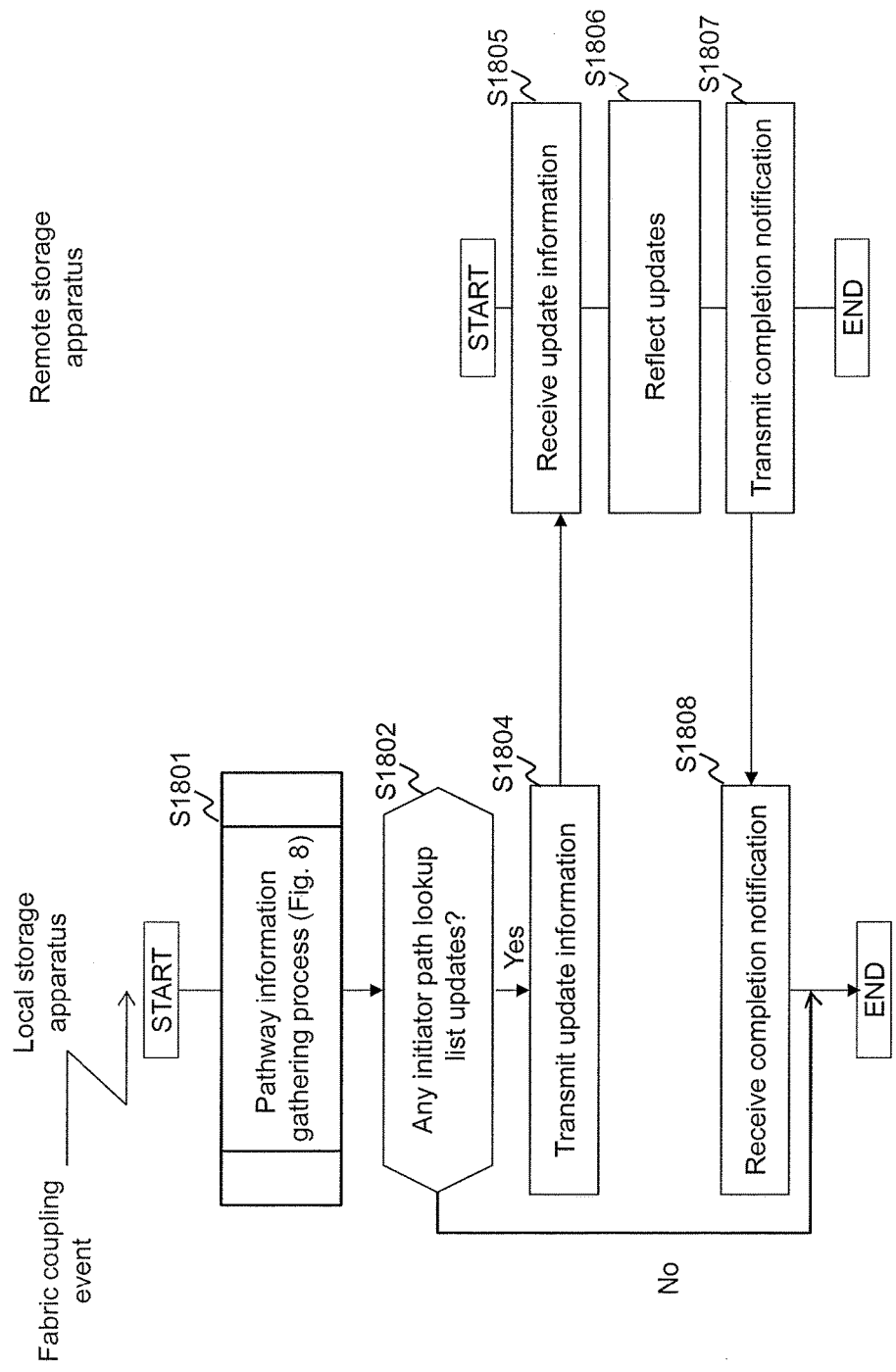
FIG. 18 is a flowchart of a pathway information sharing process performed when an IF port has logged into an FC fabric according to example 2.

FIG. 18 is a flowchart of a pathway information sharing process performed when an IF port has logged into an FC fabric according to example 2.

The pathway information sharing process is a process in which one of the storage apparatuses 101, from among the plurality of storage apparatuses 101 constituting the virtual storage apparatus 1410, acquires pathway information and shares it with another storage apparatus 101. Execution of this process is triggered by the detection of an event indicating that an IF port 112 of one storage apparatus 101 has logged into an FC fabric 115. An explanation will now be given of an example in which a storage apparatus 101 that detects the event and performs a pathway information acquisition process is referred to as a local storage apparatus 101B, and in which the pathway information is shared with a remote storage apparatus 101A, which is another storage apparatus 101, but the process is not limited to this. Further, if the virtual storage apparatus 1410 consists of three or more storage apparatuses 101, then the one storage apparatus 101 that acquires the pathway information transmits the pathway information to the plurality of other storage apparatuses 101. It should be noted that this process is performed by the CPU 107B of the local storage apparatus 101B executing a first pathway information gathering program stored in the memory 108B, and in response to this, the CPUs 108 of each storage apparatus 101 respectively executing a first pathway information sharing program stored in the memory.

In S1801 the local storage apparatus 101B performs a pathway information acquisition process. The pathway information acquisition process is as described in FIG. 8. However, in the present example, the fabric registration device list 500 and the initiator path lookup list 600 which are referred to and updated in FIG. 8 are replaced with a fabric registration device list 1500 and an initiator path lookup list 1600.

In S1802 the local storage apparatus 101B determines whether or not its own fabric registration device list 1500 and initiator path lookup list 1600 were updated by S1801. If the result of the determination is that the lists 1500, 1600 were updated (Yes in S1802), the local storage apparatus 101B prepares update information containing the information from the parts of its own lists 1500, 1600 that were updated by S1801, and transmits this to the remote storage apparatus 101A (S1804). It should be noted that the local storage apparatus 101B may transmit its own lists 1500, 1600 as update information. On the other hand, if the result of the determination is that the lists 1500, 1600 were not updated (No in S1802), the local storage apparatus 101B ends the process.

The remote storage apparatus 101A receives the update information (S1805), and based on the update information it updates its own fabric registration device list 1500 and initiator path lookup list 1600 (S1806). It should be noted that values indicating the age of the information, such as the data and time of the update, may for example be appended to the information in the lists 1500, 1600 and the update information. By this means it is possible to identify, in relation to differences between the update information and the information in the lists 1500 or 1600 corresponding to the update information, which information is most recent, and it is possible for its own lists 1500, 1600 to be updated using the most recent information, based on the update information.

In S1807 the remote storage apparatus 101A transmits to the local storage apparatus 101B a completion notification indicating that it has completed the pathway information updating process. Then in S1808 the local storage apparatus 101B receives the completion notification and ends the process. It should be noted that, in relation to part or all of the update information, if, for example, in S1806 there is information in the lists 1500, 1600 of the remote storage apparatus 101A that is more recent than the update information, then in S1807 the most recent information is transmitted to the local storage apparatus 101B together with the completion notification. Then in S1808 the local storage apparatus 101B may update its own lists 1500, 1600 based on the most recent information.

By means of the abovementioned process, if one physical storage apparatus 101 constituting the virtual storage apparatus 1410 newly establishes a coupling with an FC fabric 115, the virtual storage apparatus 1410 can update the pathway information containing the new fabric. More specifically, it is possible for said storage apparatus 101 to acquire the information relating to the initiator apparatuses 119 and the IF ports 112 that are coupled to the new fabric, to register to itself the acquired information as pathway information of the virtual storage apparatus 1410, and to synchronize with other storage apparatuses 101 constituting the virtual storage apparatus 1410.

Figure 19:
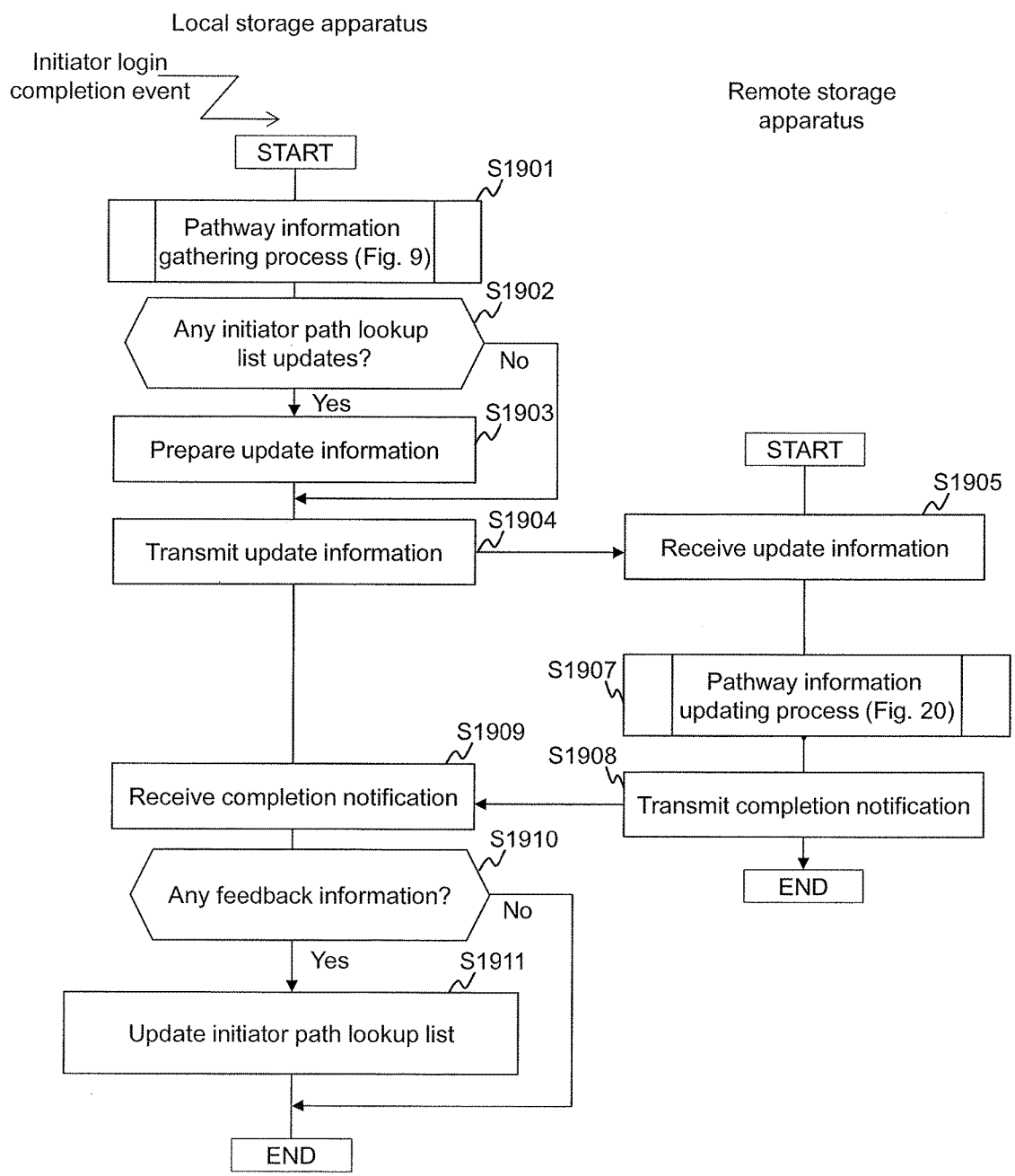
FIG. 19 is a flowchart of a pathway information sharing process performed when an initiator apparatus 119 logs in, according to example 2.

FIG. 19 is a flowchart of a pathway information sharing process performed when an initiator apparatus 119 logs in, according to example 2.

The pathway information sharing process is a process in which one of the storage apparatuses 101, from among the plurality of storage apparatuses 101 constituting the virtual storage apparatus 1410, acquires pathway information and shares it with another storage apparatus 101. Execution of the process is triggered when an event is detected indicating that an initiator apparatus 119 has completed a login to an FC device 111 of one storage apparatus 101. An explanation will now be given of an example in which a storage apparatus 101 that detects the event and performs a pathway information acquisition process is referred to as a local storage apparatus 101B, and in which the pathway information is shared with a remote storage apparatus 101A, but the process is not limited to this. Further, if the virtual storage apparatus 1410 consists of three or more storage apparatuses 101, then the one storage apparatus 101 that acquires the pathway information transmits the pathway information to the plurality of other storage apparatuses 101. It should be noted that this process is performed by the CPU 107B of the local storage apparatus 101B executing a second pathway information gathering program stored in the memory 108B, and in response to this, the CPUs 108 of each storage apparatus 101 respectively executing a second pathway information sharing program stored in the memory.

In S1901 the local storage apparatus 101B performs a pathway information acquisition process. The pathway information acquisition process is as described in FIG. 9. However, in the present example, the fabric registration device list 500 and the initiator path lookup list 600 which are referred to and updated in FIG. 9 are replaced with a fabric registration device list 1500 and an initiator path lookup list 1600.

In S1902 the local storage apparatus 101B determines whether or not the initiator path lookup list 1600 was updated in S1901. If the result of the determination is that the list 1600 was updated (Yes in S1902), the local storage apparatus 101B prepares (S1903) update information containing the information from the parts of the list 1600 that were updated in S1901, and transmits the update information to the remote storage apparatus 101A (S1904). It should be noted that the local storage apparatus 101B may transmit its own list 1600 as update information.

On the other hand, if the result of the determination is that the initiator path lookup list 1600 was not updated (No in S1902), the local storage apparatus 101B notifies the remote storage apparatus 101A that the list 1600 was not updated in S1901 (S1904).

In S1905 the remote storage apparatus 101A receives the update information or the notification that there was no update, and executes a pathway information updating process (S1907). The pathway information updating process is discussed hereinafter.

In S1908 the remote storage apparatus 101A transmits to the local storage apparatus 101B a completion notification indicating that it has completed the pathway information updating process. At this time, if the remote storage apparatus 101A has updated its own initiator path lookup list 1600 based on information other than the update information received in S1905, it transmits this information as feedback information to the local storage apparatus 101B.

In S1909 the local storage apparatus 101B receives the completion notification and determines whether or not it received feedback information together with the completion notification. If it did not receive feedback information (No in S1910), the local storage apparatus 101B ends the process. On the other hand, if it did receive feedback information (Yes in S1910), the local storage apparatus 101B updates its own initiator path lookup list 1600 based on the feedback information, and ends the process.

By means of the abovementioned process, if a target initiator apparatus has newly logged into an FC device 111 of one physical storage apparatus 101 constituting the virtual storage apparatus 1410, the virtual storage apparatus 1410 can update the pathway information containing the target initiator apparatus. More specifically, it is possible for the one storage apparatus 101 to acquire the information that is associated with the target initiator apparatus, that is associated with the IF ports that are coupled to the target initiator apparatus, and that is associated with the FC fabrics that are already coupled to the IF ports, to register to itself the acquired information as pathway information of the virtual storage apparatus 1410, and to synchronize with other storage apparatuses 101 constituting the virtual storage apparatus 1410.

Figure 20:
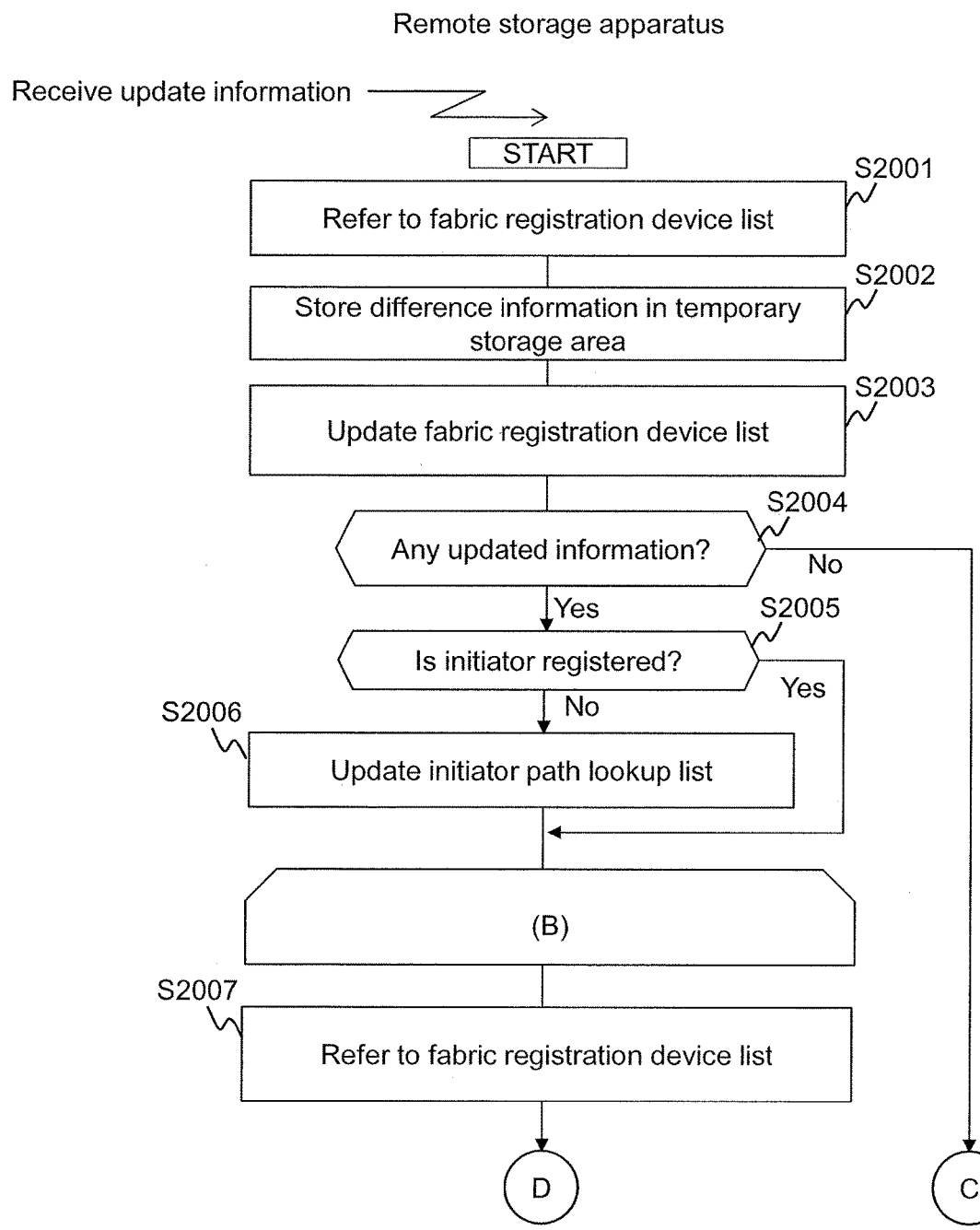
FIG. 20 is the first half of a flowchart of a pathway information updating process according to example 2.
Figure 21:
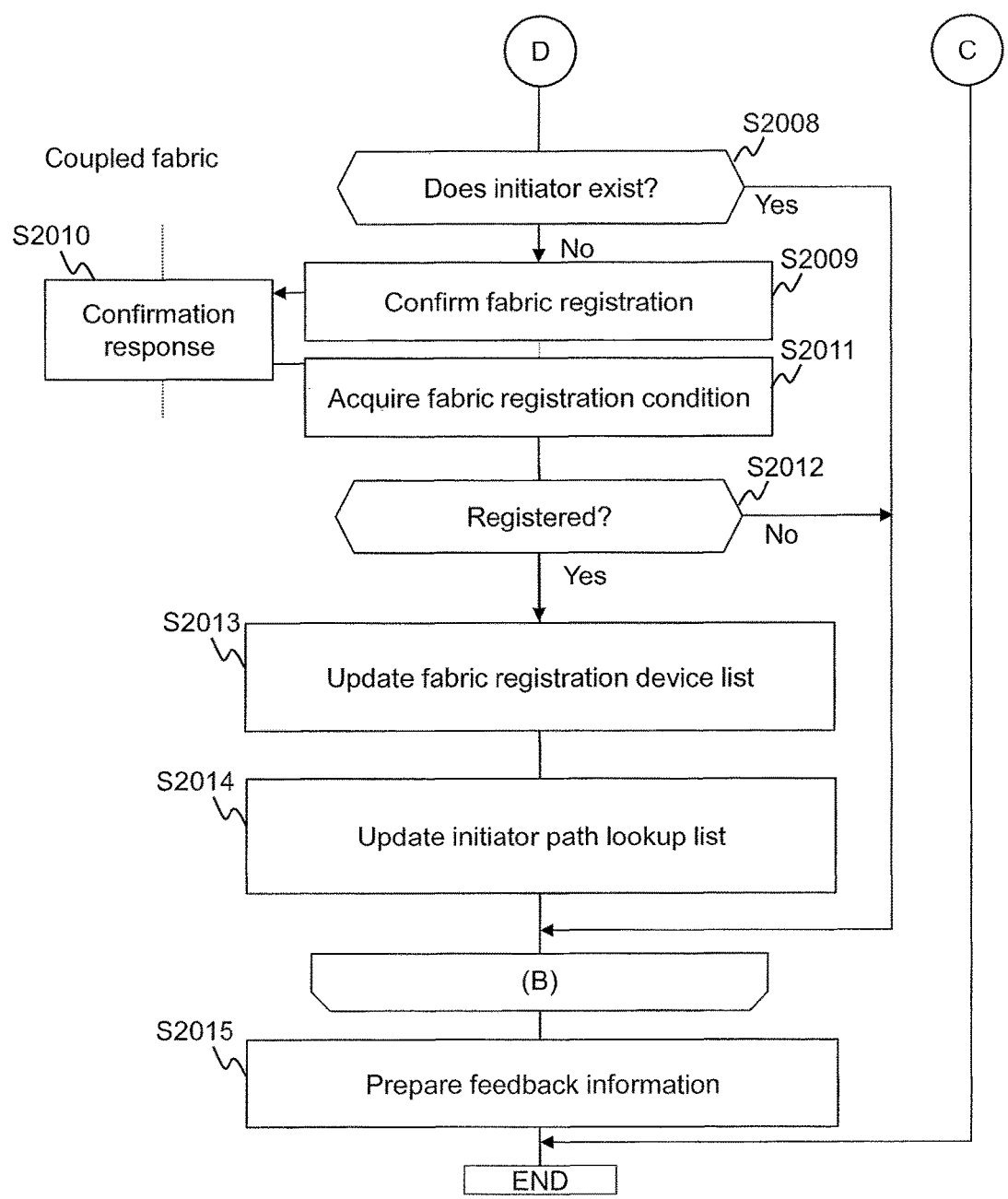
FIG. 21 is the second half of a flowchart of a pathway information updating process according to example 2.

FIG. 20 is the first half of a flowchart of a pathway information updating process according to example 2. FIG. 21 is the second half of a flowchart of a pathway information updating process according to example 2. This process is the processes in S1806 of FIG. 18 and S1907 of FIG. 19.

In S2001 the remote storage apparatus 101A refers to its own fabric registration device list 1500, and in S2002 it stores difference information indicating the differences between the received update information and the corresponding parts of its own fabric registration device list 1500 in a temporary storage area in the memory 107A.

In S2003 the remote storage apparatus 101A updates its own own fabric registration device list 1500 based on the update information.

In S2004 the remote storage apparatus 101A determines whether or not there is any difference information in the temporary storage area. If there is no difference information (No in S2004), the remote storage apparatus 101A ends the process (C in this figure, END in FIG. 21).

On the other hand, if there is difference information (Yes in S2004), the remote storage apparatus 101A determines whether the target initiator apparatus is already registered in the initiator path lookup list 1600 (S2005). If the target initiator apparatus is registered (Yes in S2005), the remote storage apparatus 101A updates the list 1600 based on the difference information (S2006), and advances the process to (B). On the other hand, if the target initiator apparatus is not registered (No in S2005), the remote storage apparatus 101A advances the process to (B).

The program sequentially selects one IF port 112 as a target port, from all the IF ports 112 of the virtual storage apparatus 1410 other than the IF ports 112 coupled to the target initiator apparatus, and for each target port it performs the following processes S2007 to S2014 (B). It should be noted that an FC fabric which is logged into (coupled to) the target port is referred to as a coupled fabric.

In S2007 the remote storage apparatus 101A refers to the fabric registration device list 1500, and in S2008 it determines whether or not the target initiator apparatus exists in the initiator list 1502 corresponding to the coupled fabric (continue to D in FIG. 21).

If the result of the determination is that the target initiator apparatus exists (Yes in S2008), the remote storage apparatus 101A selects the next target port, and returns the process to S2007. On the other hand, if the result of the determination is that the target initiator apparatus does not exist (No in S2008), the remote storage apparatus 101A advances the process to S2009.

In S2009, the remote storage apparatus 101A makes an inquiry to determine whether or not the target initiator apparatus is registered to the coupled fabric. For example, the remote storage apparatus 101A transmits to the coupled fabric a coupled confirmation request relating to the target initiator apparatus.

In S2010, the coupled fabric receives the coupled confirmation request, confirms whether or not the target initiator apparatus is registered as its own coupling destination, and transmits the confirmation response to the remote storage apparatus 101A.

In S2011 the remote storage apparatus 101A receives the confirmation response from the coupled fabric and determines, based on the confirmation response, whether or not the target initiator apparatus is registered to the coupled fabric.

If the result of the determination is that the target initiator apparatus is not registered (No in S2012), the remote storage apparatus 101A selects the next target port, and returns the process to S2007. On the other hand, if the result of the determination is that the target initiator apparatus is registered (Yes in S2012), then in S2013 the remote storage apparatus 101A updates the fabric registration device list 1500. More specifically, for example, the remote storage apparatus 101A registers the information of the target initiator apparatus corresponding to the coupled fabric in the list 1500.

In S2014 the remote storage apparatus 101A updates the initiator path lookup list 1600. More specifically, for example, the remote storage apparatus 101A registers the coupled fabric in the 'coupled fabric identifier' field of the coupled port corresponding to the target initiator apparatus in the list 1600.

In S2015 the remote storage apparatus 101A prepares feedback information. For example, the remote storage apparatus 101A prepares the information registered by process (B) as feedback information. It should be noted that the feedback information is information relating to differences between the update information and its own fabric registration device list 1500 and initiator path lookup list 1600, and may contain more recent information from its own lists 1500, 1600.

By means of the abovementioned process, if a target initiator apparatus has newly logged into an FC device 111 of one physical storage apparatus 101 constituting the virtual storage apparatus 1410, the update information of the storage apparatus 101 which has been logged into can be synchronized with other storage apparatuses 101 of the virtual storage apparatus 1410. Further, with regard to other storage apparatuses 101 of the virtual storage apparatus 1410, it is possible to acquire all the established pathway information for paths that include ports other than the coupled port and include the target initiator, and it is possible to feed this pathway information back to other storage apparatuses 101 constituting the virtual storage apparatus 1410. By this means, other pathways that include the target initiator can be included as options for a switching destination pathway if the coupled port malfunctions, and by sharing this pathway information between all the storage apparatuses 101 constituting the virtual storage apparatus it is possible to include other pathways that include the target initiator as options, irrespective of which storage apparatus 101 of the virtual storage apparatus the malfunction has occurred in.

FIG. 22 is a flowchart of a port switching process according to example 2.

The port switching process is processes #13 and 14, #18 and 19, and #26 and 27 in FIGS. 6 and 7. This process is performed by each CPU 107 of the plurality of storage apparatuses 101 constituting the virtual storage apparatus respectively executing a virtual storage port switching control program stored in each memory 109. Processes #13 and will be described in the following explanation, as being representative of these processes.

Also, an explanation will now be given of a situation in which a pathway failure is detected by a local storage apparatus 101B, which is one storage apparatus 101 constituting the virtual storage apparatus 1410, and in which that information is shared with a remote storage apparatus 101A. However, irrespective of which of the storage apparatuses 101 constituting the virtual storage apparatus 1410 a failure occurs in, a similar processes is performed with respect to the other storage device. It should be noted that if the virtual storage apparatus 1410 consists of three or more storage apparatuses, then if a pathway failure has occurred in one storage apparatus, the remote storage apparatus 101B should be read as referring to a plurality of storage apparatuses. S2101 to 2105 are respectively the same as S1001 to 1005 in FIG. 10 of example 1, except that the subject of the process is '(the CPU 107B of) the local storage apparatus 101B', and an explanation thereof is therefore omitted. In the explanation of the flow, the IF port 112 in which a failure has been detected is referred to as the failed port. Further, in the explanation of the flow, the pathway used instead of the pathway in which a pathway failure has occurred, set in S2101 to 2105, is referred to as the alternative pathway, and the parts contained in the alternative pathway are referred to as the switching destination port, the switching destination fabric and the switching destination FC device. It should be noted that in S2105 an FC device creation port allocation table 1700 is updated instead of an FC device creation port allocation table 700.

The local storage apparatus 101B prepares switching destination information including information relating to parts of its own FC device creation port allocation table 1700 that were updated in S2105, and transmits this to the remote storage apparatus 101A (S2106). It should be noted that the local storage apparatus 101B may transmit its own list 1700 as switching destination information.

The remote storage apparatus 101A receives the switching destination information (S2110), and based on the switching destination information it updates its own FC device creation port allocation table 1700 (S2111). More specifically, for example, the remote storage apparatus 101A registers identifiers of the local storage apparatus 101A and the switching destination port in the 'FC device creation destination port number' field corresponding to the switching destination FC device, in the table 1700.

In S2112 the remote storage apparatus 101A transmits to the local storage apparatus 101B a completion notification indicating that it has completed the port switching process, and it advances the process to S2113.

In S2113 the remote storage apparatus 101A refers to its own FC device creation port allocation table 1700 to determine whether or not the switching destination port is its own IF port 112A. If the result of the determination is that the switching destination port is its own IF port 112A (Yes in S2113), then in S2114 the remote storage apparatus 101A creates a switching destination FC device on the switching destination port and ends the process. It should be noted that at this time, the remote storage apparatus 101A, the remote storage apparatus 101A may transmit to initiator apparatuses 119 coupled to the failed pathway, and to FC fabrics in the failed pathway and the alternative pathway, information required to switch the failed pathway to the alternative pathway. On the other hand, if the result of the determination is that the switching destination port is not its own IF port 112A (No in S2113), the local storage apparatus 101B ends the process.

In S2107 the local storage apparatus 101B receives the completion notification. Then the local storage apparatus 101B refers to its own FC device creation port allocation table 1700 to determine whether or not the switching destination port is its own IF port B. If the result of the determination is that the switching destination port is its own IF port 112B (Yes in S2108), then in S2114 the remote storage apparatus 101A creates a switching destination FC device on the switching destination port and ends the process. It should be noted that at this time, the remote storage apparatus 101A, the remote storage apparatus 101A may transmit to initiator apparatuses 119 coupled to the failed pathway, and to FC fabrics in the failed pathway and the alternative pathway, information required to switch the failed pathway to the alternative pathway. On the other hand, if the result of the determination is that the switching destination port is not its own IF port 112B (No in S2108), the local storage apparatus 101B ends the process.

By means of the abovementioned process, if an FC fabric 115 is newly coupled to one physical storage apparatus 101 constituting the virtual storage apparatus 1410, the virtual storage apparatus 1410 can update the pathway information containing the new fabric. More specifically, it is possible for the one storage apparatus 101 to acquire the information relating to the initiator apparatuses 119 and the IF ports 112 that are coupled to the new fabric, to register to itself the acquired information as pathway information of the virtual storage apparatus 1410, and to synchronize with other storage apparatuses 101 constituting the virtual storage apparatus 1410.

In the abovementioned process, if a failure has occurred in a pathway between a specific initiator apparatus 119 and the storage apparatus 1410 due to a malfunction of a physical device such as an IF port 112 included in the failed pathway, the storage apparatus 101 possessing the malfunctioning physical device, from among the plurality of storage apparatuses 101 constituting the virtual storage apparatus 1410, can set an appropriate physical device to serve as an alternative for the physical device in which the pathway failure has occurred, and can switch to another pathway between the specific initiator apparatus 119 and the virtual storage apparatus 1410.

It should be noted that the situation in processes #13 and 14 was described above. Processes #18 and 19 are similar to the situation described hereinabove in that a pathway failure is detected. Further, processes #26 and 27 are processes performed to recover the original pathway when the physical device which caused the pathway failure has recovered. Thus in processes #26 and 27, the failed port in the abovementioned explanation is the switching destination port, and the switching destination port in the abovementioned explanation is the failed port.

Several examples have been described hereinabove, but these are examples used to explain the present invention and it goes without saying that the scope of the present invention is not limited only to these examples. The present invention can also be carried out in various other modes of example.

REFERENCE SIGNS LIST 101 storage apparatus
103 FC device
105 LU device
112 IF port
115 FC fabric

The invention claimed is:

1. A computer system comprising a storage system including a first port and a second port, and
one or more relay apparatuses which couple the first port to an initiator apparatus, and which couple the second port to the initiator apparatus, wherein
the storage system:
establishes communications between the first port and the first relay apparatus,
creates a virtual port which is a virtual port associated with the first port, and
establishes communications between the virtual port and the first relay apparatus, and
when the initiator apparatus has established communications with the virtual port and communications between the second port and the first relay apparatus have been established, the storage system:
recognizes, based on communications with the first relay apparatus, that communications have been established between the second port and the first relay apparatus and also that communications have been established between the first relay apparatus and the initiator,
stores as a first pathway an association between the first port, the first relay apparatus and the initiator apparatus,
associates the virtual port with the first port and stores this association, and
stores as a second pathway an association between the second port, the first relay apparatus and the initiator apparatus.

2. The computer system according to claim 1, wherein when the storage system detects a failure of the first pathway in a case in which communications have been established between the second port and the first relay apparatus,
the storage system:
associates the second port, in place of the first port, with the virtual port and stores this association, and
establishes communications between the virtual port and the first relay apparatus.

3. The computer system according to claim 2, wherein in a case in which communications have been established between the second port and the first relay apparatus, and after communications have been established between the virtual port associated with the second port and the first relay apparatus, and when the first pathway in which the failure had occurred has recovered,
the storage system:
associates the first port, in place of the second port, with the virtual port and stores this association, and
establishes communications between the virtual port and the first relay apparatus.

4. The computer system according to claim 3, wherein the computer system has a plurality of relay apparatuses, including the first relay apparatus, which have established communications with one or more initiator apparatuses, when the storage system detects a failure of the first pathway in a case in which communications have been established between the second port and the first relay apparatus,
the storage system:
selects from among the plurality of relay apparatuses the first relay apparatus included in the first pathway,
selects the second port which is different from the first port and which has established communications with the first relay apparatus,
associates the second port, in place of the first port, with the virtual port and stores this association, and
establishes communications between the virtual port and the relay apparatus.

5. The computer system according to claim 4, wherein the storage system includes the first port and a plurality of ports, and when the initiator apparatus has established communications with the virtual port, and communications between the plurality of ports and the first relay apparatus have been established,
the storage system recognizes, based on communications with the first relay apparatus, that communications have been established between the plurality of ports and the first relay apparatus, and also that communications have been established between the first relay apparatus and the initiator, and
when the storage system detects a failure of the first pathway, the storage system determines whether communications have been established between the first relay apparatus and a port, other than the first port, from among the plurality of ports,
when a port other than the first port is not coupled to the first relay apparatus, the storage system selects, in place of the first port, a third port, which is a port having the highest priority level from among the plurality of ports, and
the storage system establishes communications between the virtual port and the first relay apparatus.

6. The computer system according to claim 5, wherein the computer system has a plurality of relay apparatuses, including the first relay apparatus, which are coupled to one or more initiator apparatuses,
the storage system:
associates each of the plurality of relay apparatuses with information relating to the initiator apparatuses with which the respective relay apparatuses have themselves established communications, and stores these associations,
in a case in which communications have been established between the first port and the first relay apparatus and when the storage system detects a failure of the first pathway,
determines whether a port other than the first port has established communications with the first relay apparatus,
when communications between the first relay apparatus and a port other than the first port have not been established,
selects a fourth port which is associated with a second relay apparatus which is a relay apparatus with which the largest number of initiator apparatuses have established communications, other than the first relay apparatus,
associates the third port, in place of the first port, with the virtual port, and
establishes communications between the virtual port and the first relay apparatus.

7. The computer system according to claim 1, wherein the storage system comprises a first storage apparatus and a second storage apparatus coupled to the first storage apparatus, and provides the initiator apparatus with a virtual storage apparatus which is a storage apparatus that is virtual,
when the first storage apparatus has the first port and the second storage apparatus has the second port, and moreover communications are established between the second port and the first relay apparatus,
the first storage apparatus:
establishes communications between the first port and the first relay apparatus,
creates a virtual port which is a virtual port associated with the first port, and
establishes communications between the virtual port and the first relay apparatus, and
each of the first storage apparatus and the second storage apparatus,
in a case in which the initiator apparatus has established communications with the virtual port, and communications between the second port and the first relay apparatus have been established,
recognize, based on communications with the first relay apparatus, that communications have been established between the second port and the first relay apparatus, and also that communications have been established between the first relay apparatus and the initiator,
store as a first pathway an association between the first port, the first relay apparatus and the initiator apparatus, and
store as a second pathway an association between the second port, the first relay apparatus and the initiator apparatus, and
the first storage apparatus associates the virtual port with the first port and stores this association.

8. The computer system according to claim 7, wherein the first storage apparatus:
transmits information relating to the first pathway to the second storage apparatus,
the second storage apparatus
receives and stores the information relating to the first pathway,
stores as a second pathway an association between the second port, the relay apparatus, and the initiator apparatus, and
transmits information relating to the second pathway to the first storage apparatus, and
the first storage apparatus receives and stores the information relating to the second pathway.

9. The computer system according to claim 8, wherein in a case in which communications have been established between the second port and the first relay apparatus, when the first storage apparatus detects a failure of the first pathway,
the first storage apparatus associates the second port, in place of the first port, with the virtual port and stores this association, and transmits this association to the second storage apparatus, and
the second storage apparatus receives and stores the association between the second port and the virtual port.

10. A storage apparatus, comprising a first port, a second port, a memory and a controller, wherein
the first port is coupled to an initiator apparatus via a relay apparatus, and the second port is coupled to the a initiator via the relay apparatus, the controller:

establishes communications between the first port and the first relay apparatus, creates a virtual port which is a virtual port associated with the first port, establishes communications between the virtual port and the first relay apparatus, when the initiator apparatus has established communications with the virtual port, and communications between the second port and the first relay apparatus have been established, recognizes, based on communications with the first relay apparatus, that communications have been established between the second port and the first relay apparatus, and also that communications have been established between the first relay apparatus and the initiator, stores as a first pathway an association between the first port, the first relay apparatus and the initiator apparatus, associates the virtual port with the first port and stores this association, and stores as a second pathway an association between the second port, the first relay apparatus and the initiator apparatus.

11. A control method for a storage apparatus which has a first port, a second port, a memory and a controller, with the first port being coupled to an initiator apparatus via a relay apparatus, and the second port being coupled to the initiator via the relay apparatus, the method operating the controller to establish communications between the first port and the first relay apparatus, to create a virtual port which is a virtual port associated with the first port, to establish communications between the virtual port and the first relay apparatus, when the initiator apparatus has established communications with the virtual port, and communications between the second port and the first relay apparatus have been established, to recognize, based on communications with the first relay apparatus, that communications have been established between the second port and the first relay apparatus, and also that communications have been established between the first relay apparatus and the initiator, to store as a first pathway an association between the first port, the first relay apparatus and the initiator apparatus, to associate the virtual port with the first port and stores this association, and to store as a second pathway an association between the second port, the first relay apparatus and the initiator apparatus.

* * * * *